(12) United States Patent
Chern et al.

(10) Patent No.: US 10,073,557 B2
(45) Date of Patent: Sep. 11, 2018

(54) FORCE SENSING STRUCTURE AND FORCE SENSING DEVICE INCLUDING THE SAME

(71) Applicant: UNEO INCORPORATED, Taipei (TW)

(72) Inventors: Yann-Cherng Chern, New Taipei (TW); Han-Ying Lei, New Taipei (TW); Chih-Sheng Hou, Taipei (TW); Chia-Hung Chou, New Taipei (TW)

(73) Assignee: Uneo Incorporated, Taipei (TW)

( * ) Notice: Subject to any disclaimer, the term of this patent is extended or adjusted under 35 U.S.C. 154(b) by 108 days.

(21) Appl. No.: 15/257,655

(22) Filed: Sep. 6, 2016

(65) Prior Publication Data

US 2017/0068383 A1 Mar. 9, 2017

Related U.S. Application Data

(60) Provisional application No. 62/216,055, filed on Sep. 9, 2015, provisional application No. 62/222,965, filed on Sep. 24, 2015.

(51) Int. Cl.
*G06F 3/00* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0414* (2013.01); *G06F 2203/04101* (2013.01)

(58) Field of Classification Search
CPC ...... G06F 3/0416; G06F 3/044; G06F 3/0412; G06F 3/0414; G06F 2203/04101; G02F 1/133308; G02F 1/13338; G02F 1/133345; G02F 1/134336; G02F 2001/133331; G02F 2202/28
See application file for complete search history.

(56) References Cited

U.S. PATENT DOCUMENTS

| | | | |
|---|---|---|---|
| 2010/0033354 A1* | 2/2010 | Ejlersen | G06F 3/044 341/33 |
| 2017/0364191 A1* | 12/2017 | Jiang | G06F 3/017 |
| 2017/0371475 A1* | 12/2017 | Cheng | G06F 3/0416 |

* cited by examiner

*Primary Examiner* — Muhammad N Edun
(74) *Attorney, Agent, or Firm* — Muncy, Geissler, Olds & Lowe, P.C.

(57) ABSTRACT

A force sensing structure and a force sensing device including the same are provided. The force sensing structure is configured to detect a proximity of an object to the force sensor from an upside and a force applied by the object to the force touch sensor. The force sensing structure includes a first electrode and a first capacitance material layer. The first capacitance material layer is disposed adjacent to the first electrode. When the object approaches the force touch sensor, the force touch sensor is configured to detect the proximity of the object according to a first capacitance variation, and when the object contacts the force sensor and deforms of the first capacitance material layer, the force touch sensor is configured to detect the force applied by the object according to a second capacitance variation.

27 Claims, 49 Drawing Sheets

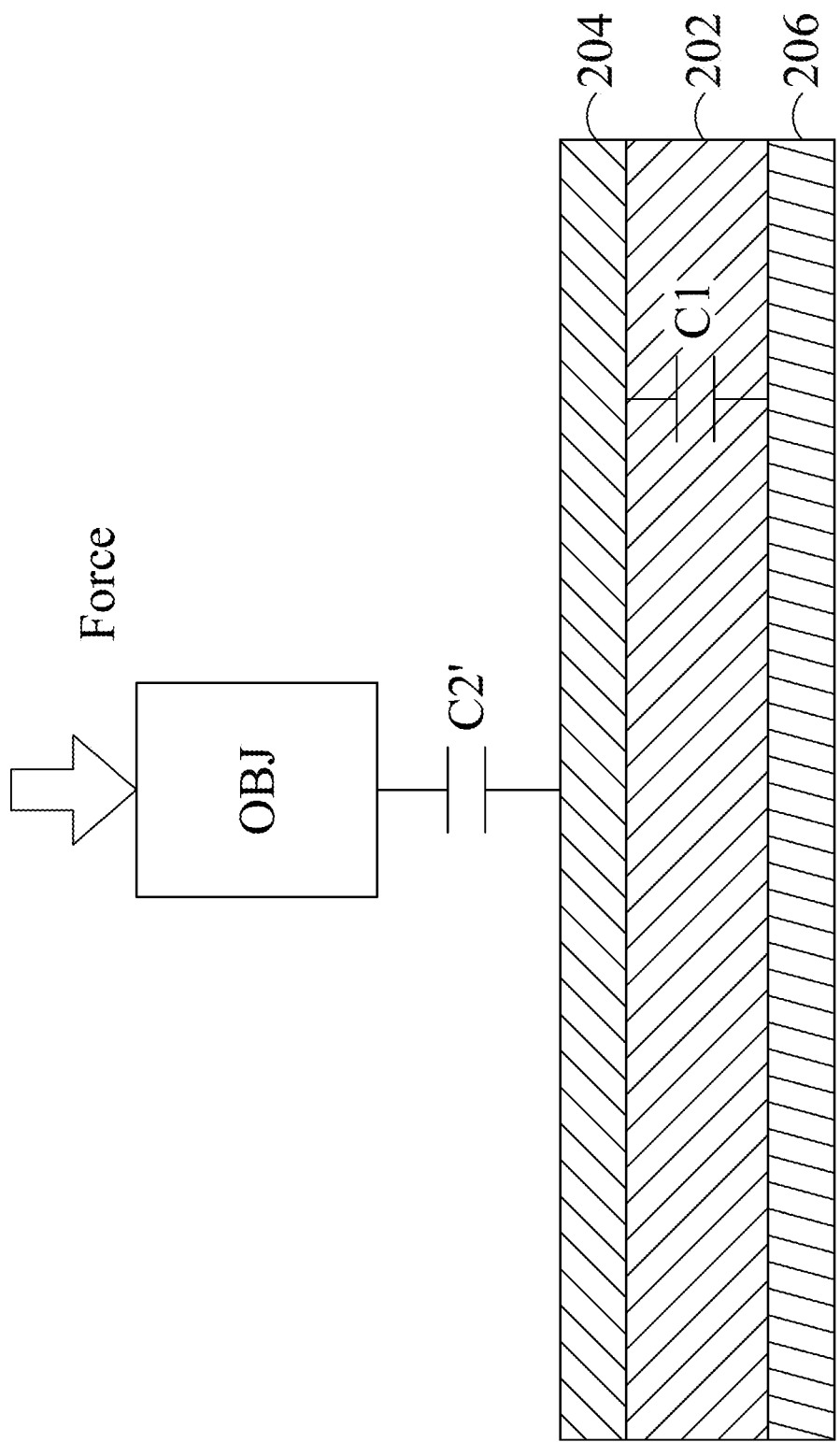

FORCE SENSING STRUCTURE AND FORCE SENSING DEVICE INCLUDING THE SAME

CROSS-REFERENCE TO RELATED APPLICATION

This application claims priority to U.S. Provisional Patent Application No. 62/216,055, filed on Sep. 9, 2015 and U.S. Provisional Patent Application No. 62/222,965, filed on Sep. 24, 2015, in the United States Patent and Trademark Office, the disclosure of those are incorporated herein in its entirety by reference.

BACKGROUND OF THE INVENTION

1. Field of the Invention

The present disclosure relates in general to a force sensing structure and a force sensing device including the same, and more particularly to a force sensing structure and a force sensing device including the same capable of detecting the proximity of the object and the force applied by the object according to capacitance variation.

2. Description of the Related Art

In general, there are various kinds of electronic devices that include input units for data input and output units for data output. A typical example of such an input unit may be a key button unit, and a typical example of the output unit may be a display unit including a liquid crystal display (LCD) module.

Moreover, when contacted by a user causes the device to change a state associated with the button, pressing or selecting the button can activate or deactivate some state of the device and cause an associated action to be performed. Not pressing or selecting the button can leave the device in its current state with no associated action being performed.

More recently, a touch screen device have been developed that can perform data input/output (I/O) and display data at the same position in order to considerably reduce the size of an electronic device and diversify functions thereof. In such a touch screen device, a transparent touch panel is disposed on an LCD module to perform input and output simultaneously. Touch panels are generally classified into various types based on their physical construction/mode of operation, for example, a resistive touch panel and a capacitive touch panel.

In general, a touch screen device accepts data input by using a user's finger, and the conventional touch devices merely provide a position detection by utilizing the capacitive detection or resistive detection. Although the touch sensing technique provides users an instinctive way to input signals, the bottom needs to be provided by the interface of the executed software. Therefore, the force sensing functions are further developed, such that the users may have more options to input while using their fingers.

However, extra force touch sensors are needed to be designated into the conventional touch sensing module, and the thickness of the touch sensing device cannot be shrinked, such that the volume of the electronic device are limited.

SUMMARY OF THE INVENTION

In view of the aforementioned technical problems, the primary objective of the present disclosure provides a force sensing structure and a force sensing device including the same, which is capable of detecting the proximity of the object and the force applied by the object according to capacitance variation.

In accordance with one objective of the present disclosure, a force sensing structure is provided. The force sensing structure includes a force touch sensor configured to detect a proximity of an object to the force touch sensor from an upside and a force applied by the object to the force touch sensor, the force touch sensor comprising a first electrode disposed separately from the object with a gap, and a first capacitance material layer disposed adjacent to the first electrode. When the object approaches the force touch sensor, the force touch sensor is configured to detect the proximity of the object according to a first capacitance change therebetween, and when the object contacts the force touch sensor and at least a portion of the force is applied to the first capacitance material layer, the force touch sensor is configured to detect the force applied by the object according to a second capacitance change therebetween.

Preferably, the first capacitance material layer may be disposed on the first electrode.

Preferably, the first capacitance material layer may be made of piezo-capacitive material, and when the object contacts the force touch sensor and at least a portion of force is applied to first capacitance material layer, the force touch sensor is configured to detect the force applied by the object according to the second capacitance change therebetween, which has substantially positive correlation with a magnitude of the applied force.

Preferably, the first electrode is disposed on the first capacitance material layer.

Preferably, the force sensing structure may further include a base layer disposed under the first capacitance material layer and an insulating layer disposed on the first electrode, wherein the base layer and the object are grounded, when the object contacts the force touch sensor and at least a portion of force is applied to the first capacitance material layer, the force touch sensor detects the force applied by the object according to the second capacitance change therebetween.

Preferably, the force sensing structure may further include a second electrode disposed under the first capacitance material layer. The first capacitance material layer may be disposed to contact at least one of the first electrode and the second electrode, and the force touch sensor may be configured to detect the force applied to the object according to the second capacitance change between the first electrode and the second electrode.

Preferably, the force sensing structure may further comprising an insulating layer disposed on the first electrode, and a switch electrically connected between the first electrode and the second electrode. When the switch is closed and the object is grounded, the first electrode may be shorted with the second electrode, and the force touch sensor may detect the force applied to the object according to the second capacitance change between the first electrode and the second electrode.

Preferably, when the switch is opened and the first electrode is grounded, the force touch sensor may detect the force applied to the object according to the second capacitance change of the second electrode and the first capacitance material layer.

Preferably, the force sensing structure may further include an air gap between the first capacitance material layer and the first electrode, and the air gap may be partially filled with a second capacitance material layer.

Preferably, the force sensing structure may further comprising an air gap between the first capacitance material layer and the first electrode, and the air gap may be filled with a second capacitance material layer.

Preferably, the object may be deformable, when the force is applied to the object, a part of the object approaches to the first electrode, and the force touch sensor detects the force applied to the object according to the first capacitance change, and when the object comes to contact the first electrode, the force touch sensor detects the force applied to the object according to the second capacitance change due to a force transfer to the first capacitance material layer.

Preferably, the object may be deformable and substantially sheet-shaped, and when the force is applied to the object, a part of the object corresponding to a position where the force is applied approaches to the first electrode, and the force touch sensor detects the force applied to the object according to the first capacitance change, and when the object comes to contact the first electrode, the force touch sensor detects the force applied to the object according to the second capacitance change due to a force transfer to first capacitance material layer.

Preferably, the force sensing structure may further include a second electrode disposed between the first electrode and the first capacitance material layer, an insulating layer disposed between the first electrode and the second electrode, and a third electrode disposed under the first capacitance material layer. When the object approaches the force touch sensor, the force touch sensor is configured to detect the proximity of the object according to a first capacitance change between the first electrode and the object, and when the object contacts the force touch sensor and applies at least a portion of the force to the first capacitance material layer, the force touch sensor is configured to detect the force applied to the object according to a second capacitance change between the second electrode and the third electrode.

Preferably, the force sensing structure may further include an air gap between the second electrode and the third electrode, and the air gap may be partially or totally filled with a second capacitance material layer.

In accordance with another objective of the present disclosure, a force sensing device is provided. The force sensing device includes a plurality of sensor cells configured to detect a proximity of an object to the force sensing device from an upside and a force applied by the object to the force sensing device, and each sensor cell includes the force sensing structure mentioned above, a driving circuit coupled to each of the sensor cell through a plurality driving lines for sequentially applying the driving signals to the driving lines, a sensing circuit coupled to each of the sensor cell through a plurality sensing lines, the sensing circuit being configured to receive sensing signals generated by detecting a change in the first capacitance and the second capacitance sensed from each of the sensing cells, and a processor configured to receive the sensing signals from the sensing circuit to determine touched positions, the proximities, and the applied force.

Preferably, the force sensing structure may further include a second electrode disposed under the first capacitance material, and the first electrodes and the second electrodes of each of the plurality of the sensor cells are shared by the corresponding sensor cells disposed in same column or row.

Preferably, the sensor cells are sufficiently mechanically isolated from each other.

Preferably, the force sensing structure may further include a second electrode disposed above the first electrode, an insulating layer disposed between the first electrode and the second electrode, and a grounded base disposed under the first capacitance material layer. When the object approaches the force touch sensor, the force touch sensor may be configured to detect the proximity of the object according to a first capacitance change between the first electrode and the object, and when the object contacts the force touch sensor and applies at least a portion of the force to the first capacitance material layer, the force touch sensor may be configured to detect the force applied to the object according to a second capacitance change between the first electrode and the second electrode.

Preferably, the force sensing device may further include an outside housing encapsulating the force sensing device, and at least one support structure inside the housing to support the force sensing structure.

Preferably, the force sensing device may further include a cover glass disposed on the plurality of sensor cells, a display module disposed between the plurality of sensor cells and the cover glass, and attached to the cover glass, and a first frame disposed under the plurality of sensor cells and provided with a first cavity for accommodating the display module and the plurality of sensor cells.

Preferably, the plurality of sensor cells are arranged in the first cavity, and the plurality of sensor cells is attached to one of the display module and a surface of the first cavity.

Preferably, the force sensing device may further include a second frame disposed under the cover glass and in the first cavity, the second frame having a second cavity for accommodating the display module.

Preferably, the force sensing device may further include a buffer layer disposed adjacent to the plurality of the sensor cells.

Preferably, the buffer layer may include a material sheet and at least one bumper.

Preferably, the force sensing device may further include a buffer layer disposed under the display module and adjacent to the plurality of the sensor cells.

Preferably, the buffer layer may include a foam sheet.

Preferably, the buffer layer may include at least one force concentration feature.

As mentioned previously, the force sensing and the force sensing device including the same of the present disclosure may have one or more advantages as follows.

1. The proximity and the applied force can be detected by a single sensor including dual-mode. The proximity mode and the contact mode of the force sensing structure are both capable of detecting the proximity and the applied force according to the capacitance variations therein, such that an extra force sensing device (or sensor) may be omitted, and the thickness of the force sensing module may further be shrinked.

2. By adding the buffer layer or the buffer structure in the mechanical structure of the force sensing device, structural destructions may be prevented while the solid part of any members directly contacts the sensor film. Extra metal parts may also be included in the force sensing structure to serve as an electrode of another capacitive sensing structure to adjust the sensing mode, the strength of the sensing signals, and the signal to noise ratio, and a side force sensing function may also be achieve by utilizing the force sensing structure of the present application.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1A:
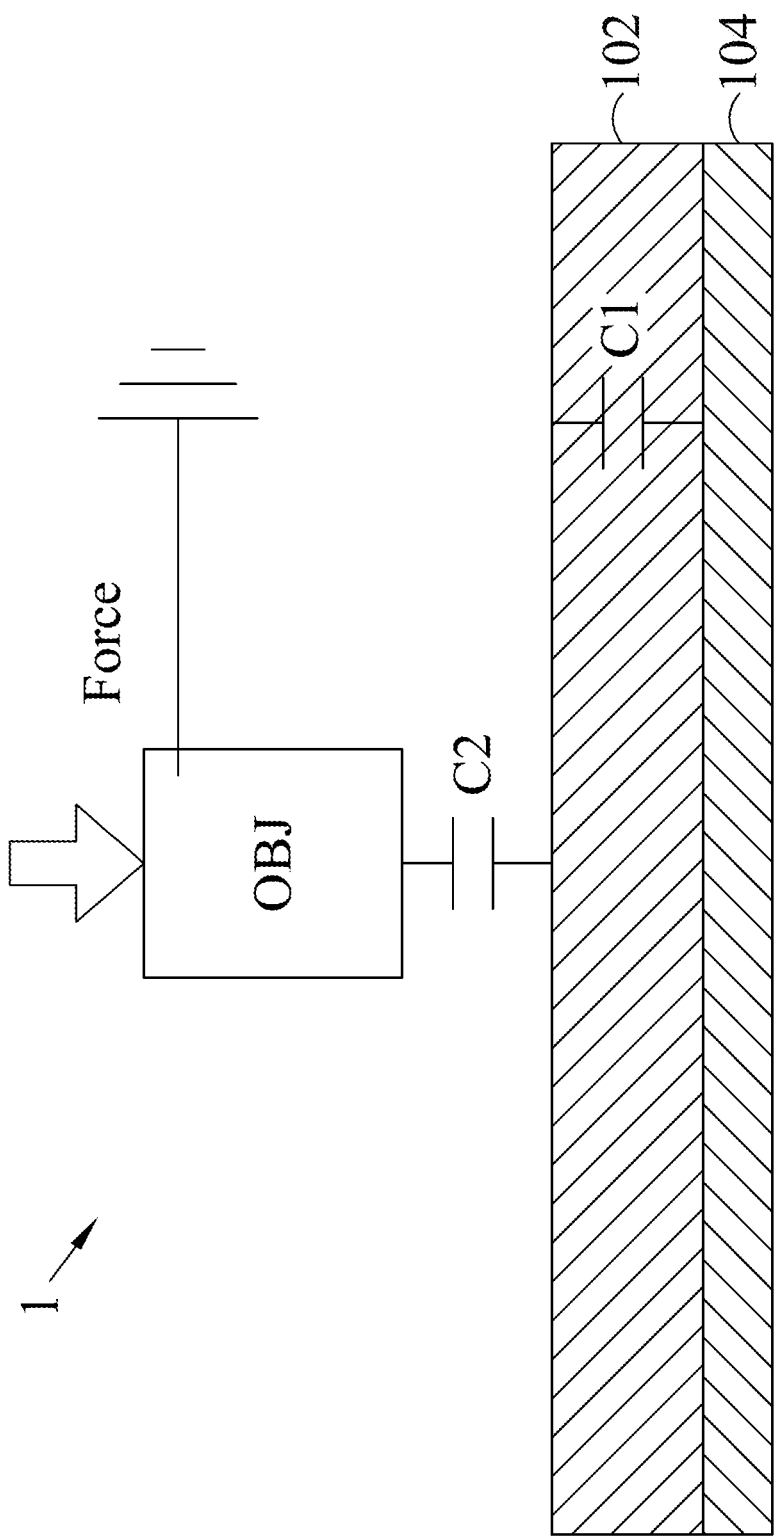
FIGS. 1A-1I are schematic diagrams and plots of capacitance versus force on the sensor of the first embodiments of a force sensing structure of the present disclosure.

Hereinafter, embodiments of the present disclosure will be described in detail with reference to the accompanying drawings so that those skilled in the art to which the present disclosure pertains can realize the present disclosure. As those skilled in the art would realize, the described embodiments may be modified in various different ways, all without departing from the spirit or scope of the present disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be further understood that although the terms first and second are used herein to describe various elements, these elements should not be limited by these terms. These terms are only used to distinguish one element from another element.

For clarity and conciseness of the description, parts may be omitted from the drawings, and same reference characters or numerals may indicate identical parts or analogous parts. In the drawings, thicknesses of layers, films, panels, regions, etc., may be exaggerated for clarity and may not limit embodiments of the invention. If an element such as a layer, film, region, or substrate is referred to as being "on" another element, it can be directly on the other element, or an intervening element may be present.

Figure 1B:
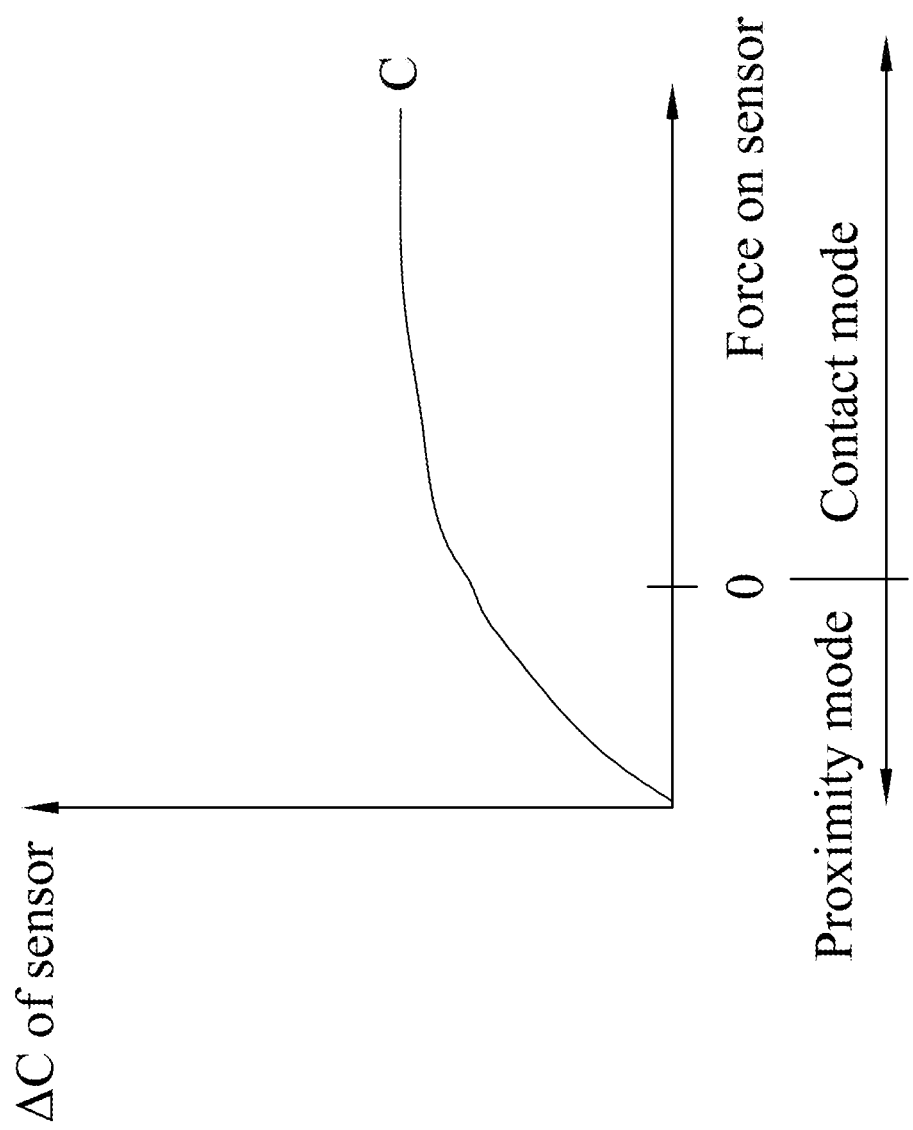

Please refer to FIGS. 1A-1I, those are schematic diagrams and plots of capacitance versus force on the sensor of the first embodiment of a force sensing structure of the present disclosure. As shown in the FIG. 1A, a force sensing structure 1 includes a first capacitance material layer 102 and a first electrode 104, and the first electrode 104 is disposed separately from an object OBJ with a gap. When the force is applied to the object OBJ, which approaches the force sensing structure 1, and the force sensing structure 1 is configured to detect the proximity of the object OBJ according to the capacitance variation of the second capacitance C2. In detail, the force sensing structure 1 may act as a self capacitive sensor, when the object OBJ, e.g., finger, is proximate to the force sensing structure 1, the first electrode 104 can capacitively couple to the object OBJ, and causing the electric charge to be shunted from the first electrode 104 to the object OBJ. As a result, the capacitance at the force sensing sensor 1 can be increased. As the object OBJ gets closer to the first capacitance material layer 102, the amount of shunted charge can continue to increase, which in turn causes the continuous increase of the capacitance. Thus, when a sensing circuit detects a raise in capacitance at the force sensing structure 1, the raise can be interpreted as the object OBJ being proximate to the force sensing structure 1. As shown in FIG. 1B, the proximity of the object OBJ may cause the capacitance variation as shown in "Proximity mode" of FIG. 1B.

Next, as the object OBJ contacts the force touch sensor 1 and deforms the first capacitance material layer 102, the force touch sensor 1 is configured to detect the force applied by the object according to a capacitance variation of the first capacitance C1. The thickness of the first capacitance material layer 102 is decreased as a magnitude of the force is increased, therefore the capacitance of the first capacitance C1 is increased, as shown in "Contact mode" of FIG. 1B, therefore, the proximity of the object OBJ and the force applied to the object OBJ may be determined by calculating the capacitance variation of the total capacitance C.

Preferably, the object OBJ may include a metallic or semi-conducting material, which is able to induce a capacitance with the first electrode 104. Note that the object may not be composed of metal, such that the object OBJ may only be detected in the proximity mode.

Figure 1C:
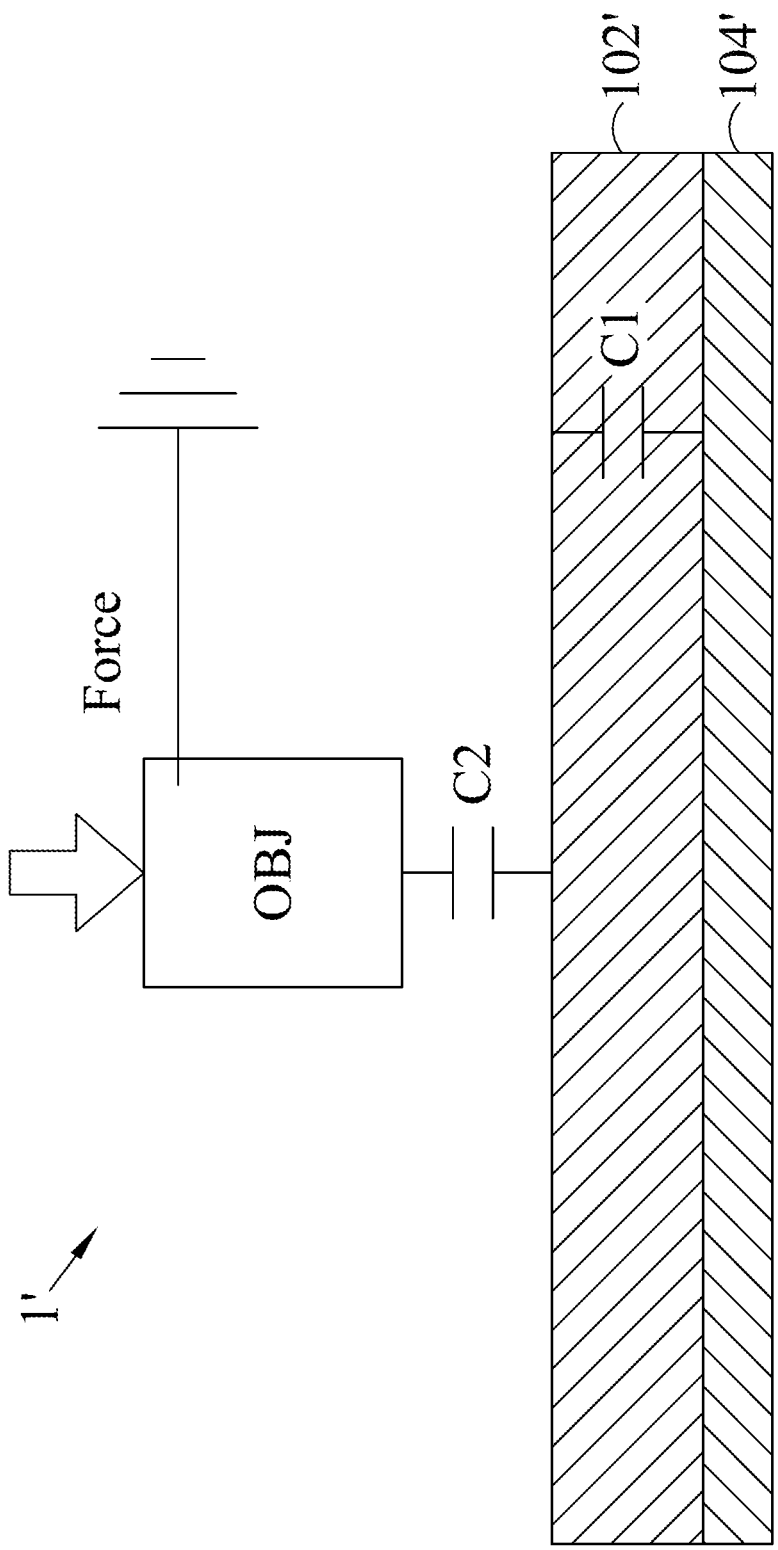

Please refer to FIG. 1C, when the first capacitance material layer 102 is replaced as a piezo-capatance material layer 102' of the force sensing structure 1', which can change the characteristic of the capacitance variation ΔC v.s. the force on sensor. For example, when the object OBJ contacts the force touch structure 1' and changes the thickness of the piezo-capatance material layer 102', the force touch structure 1' is configured to detect the force applied by the object OBJ according to the capacitance variation of the first capacitance C1, which has linear relationship with a magnitude of the applied force, as shown in FIG. 1D.

In another embodiment of the present application, the object OBJ may be plate-shaped and flexible, and the gap between the object OBJ and the force touch structure may be filled with necessary elements commonly utilized in the touch panel. As two ends of the object OBJ are fixed, when the force is applied to the object OBJ, a part of the object OBJ may be curved by the applied force. Here, the second capacitance C2 may also be changed to C2', which means the applied force may also be detected in the proximity mode, and the flexibility of the force sensing structure may further be increased.

Figure 1D:
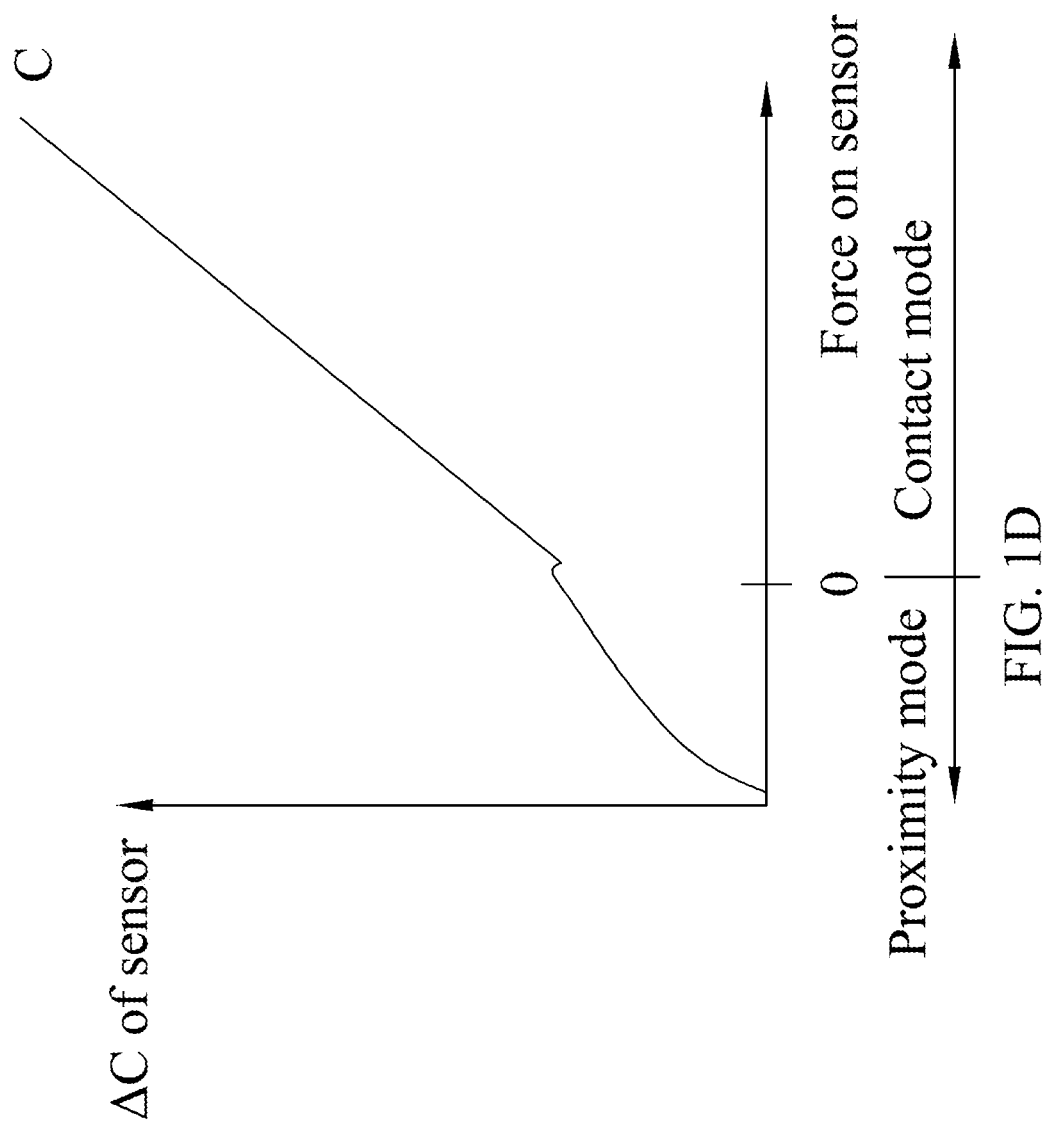
Figure 1E:
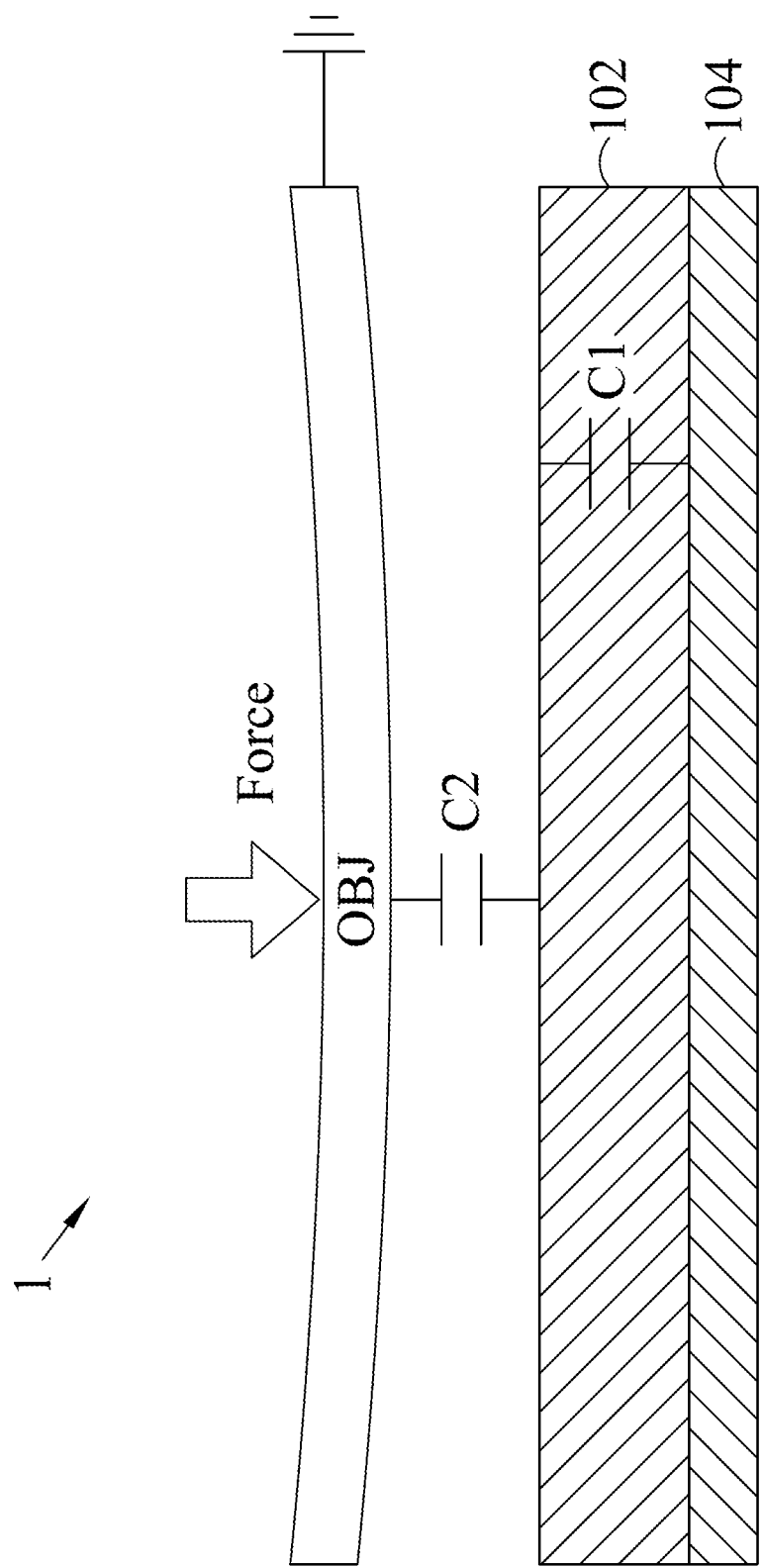
Figure 1F:
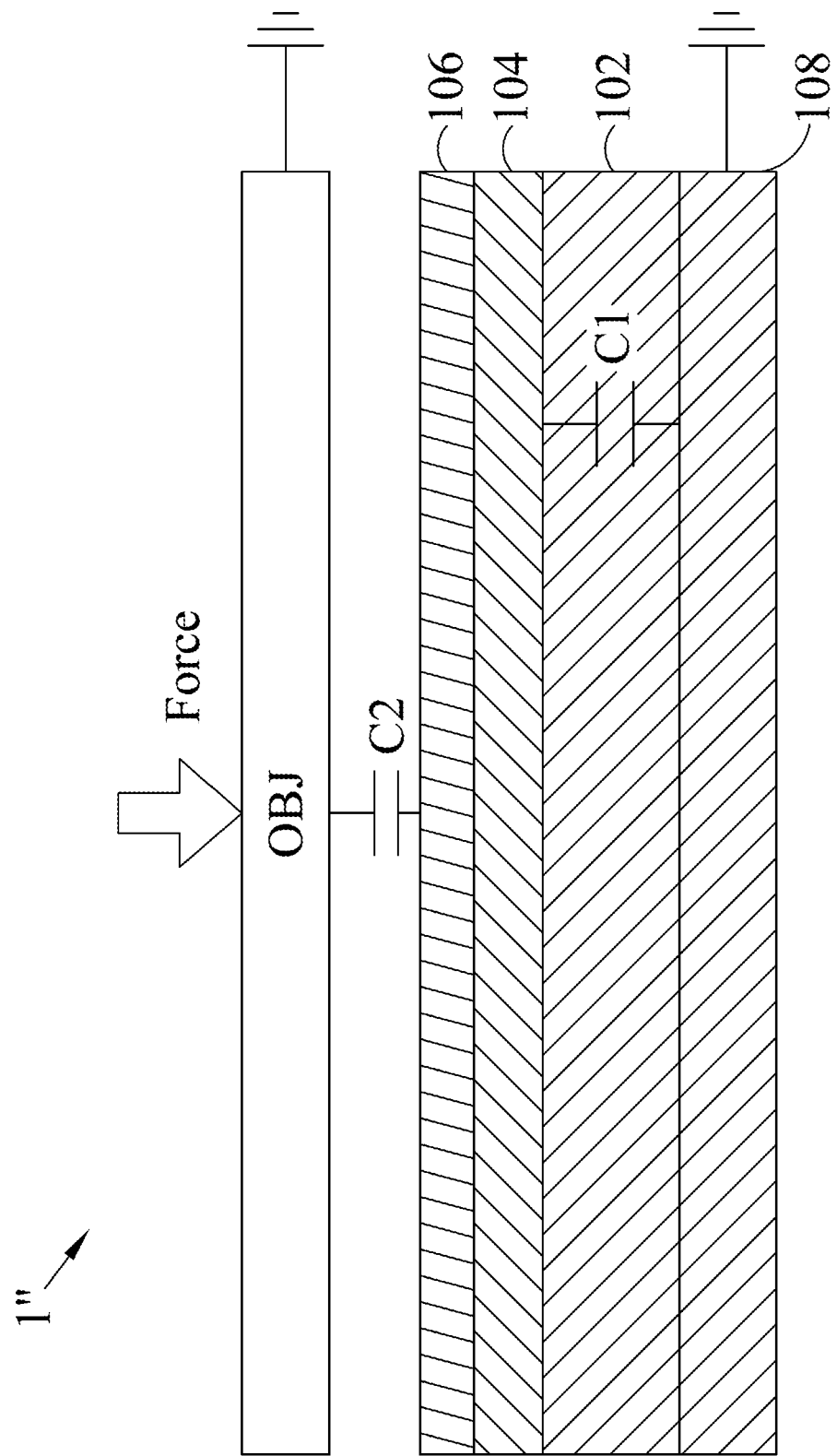
Figure 1G:
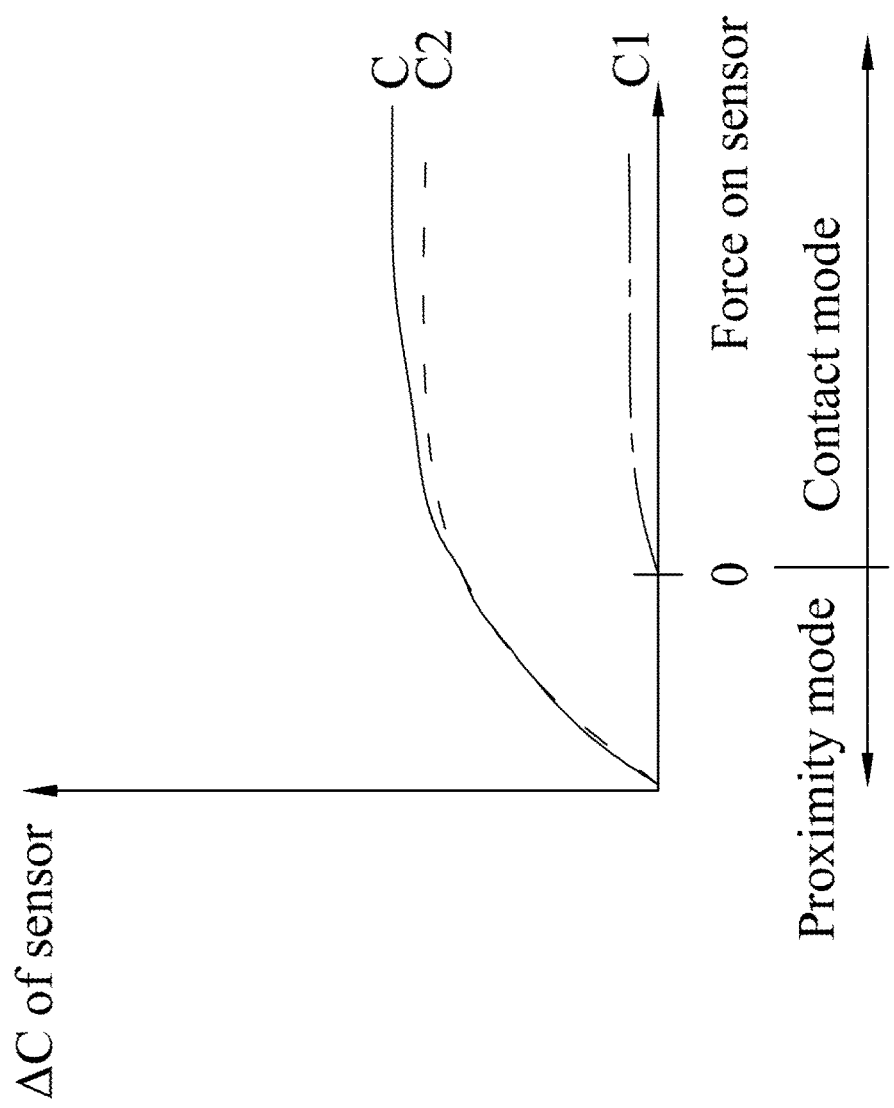

Now turn to FIG. 1F, which illustrates another embodiment of the force sensing structure of the present application. The force sensing structure 1" includes a first capacitance material layer 102, a first electrode 104, an insulating layer 106, and a base layer 108. In the embodiment, the object OBJ and the base layer are grounded. The first electrode 104 should be prevented from being shorted with the grounded object by the insulating layer 106, and the first capacitance C1 generated between the first electrode 104 and the base layer 108 and the second capacitance C2 generated between the first electrode 104 and the object OBJ are in series, therefore the total capacitance C=(C1*C2)/(C1+C2). Similar to the embodiments mentioned above, the proximity of the object OBJ and the force applied to the object OBJ can be detected in the proximity mode and the contact mode according to the relationship between the capacitance variation ΔC and the applied force, as shown in FIG. 1G.

Figure 1H:
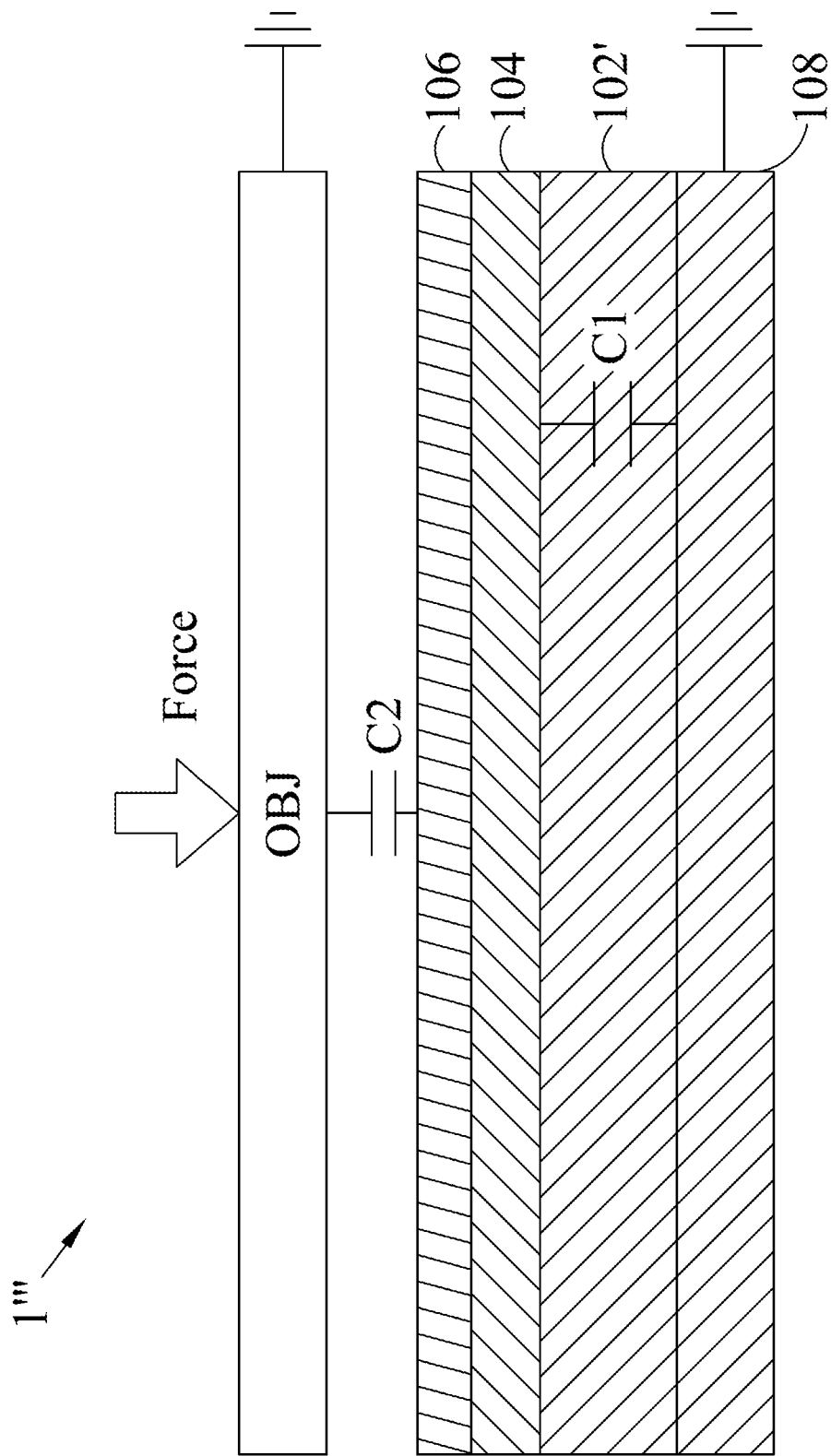
Figure 1I:
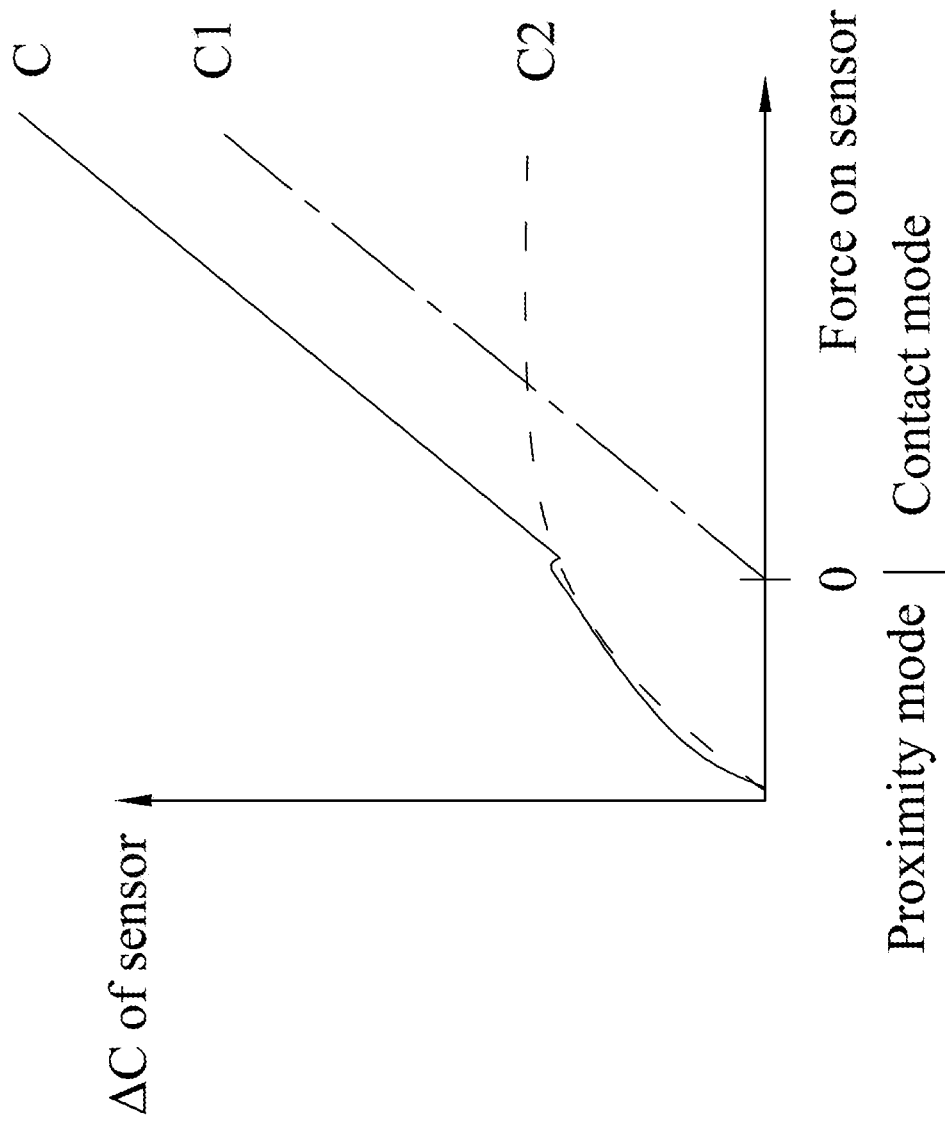

Similar to FIGS. 1C and 1D, the first capacitance material layer 102 is replaced by a piezo-capacitance material layer 102' in the force sensing structure 1''', and the relationship of the capacitance variation and the applied force may also be represented as a linear equation due to the piezo-capacitance material layer 102' in FIGS. 1H and 1I.

Figure 2A:
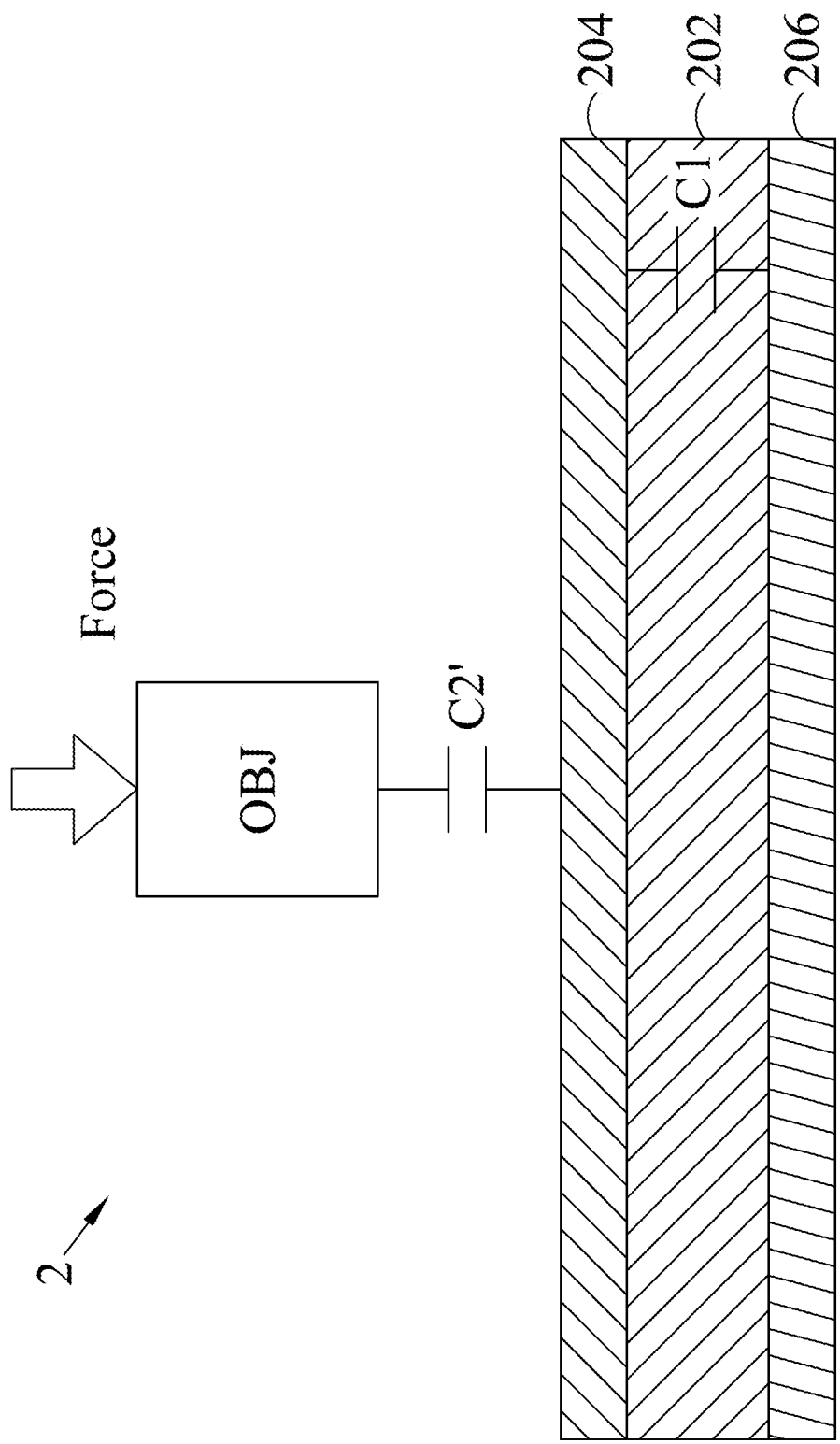
FIGS. 2A-2O are schematic diagrams and plots of capacitance versus force on the sensor of the second embodiments of a force sensing structure of the present disclosure.
Figure 2C:
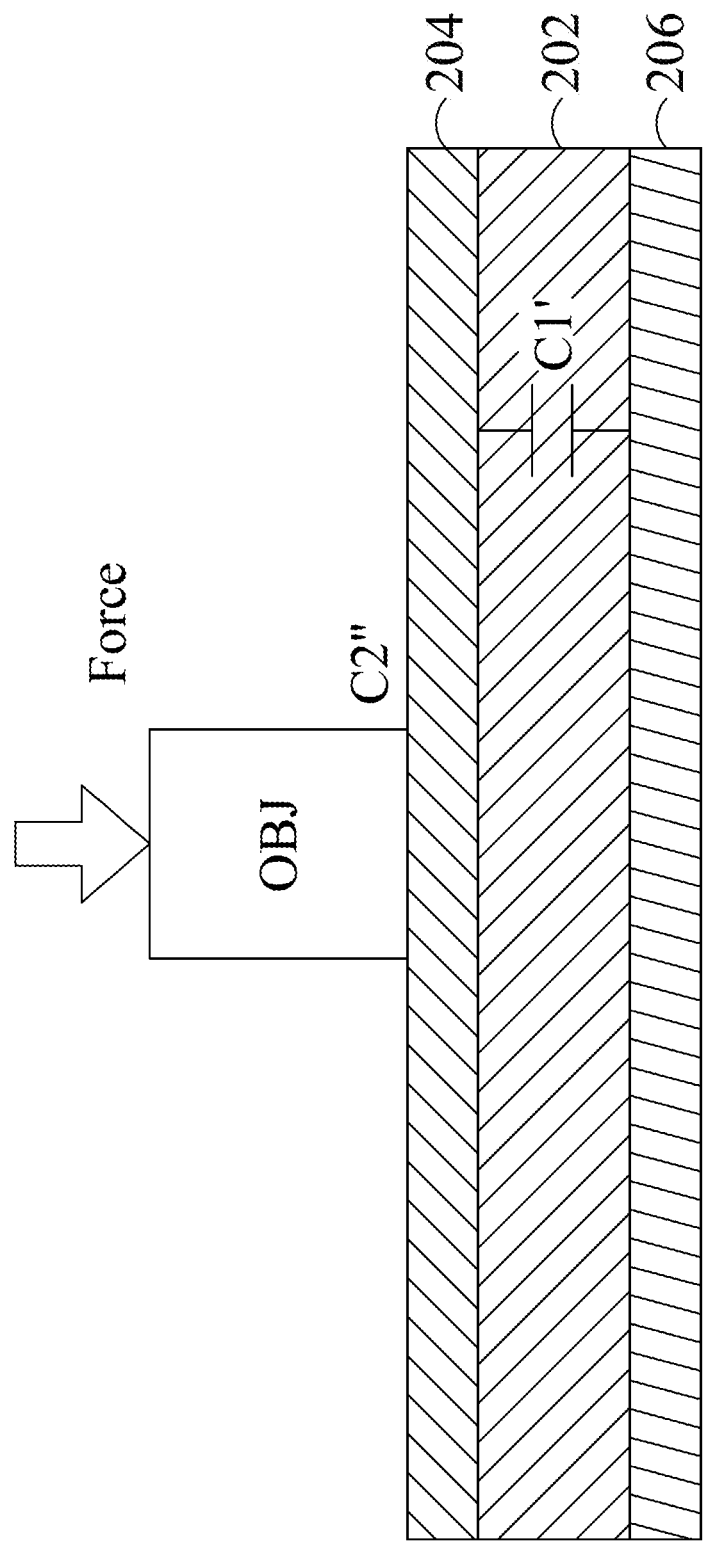
Figure 2D:
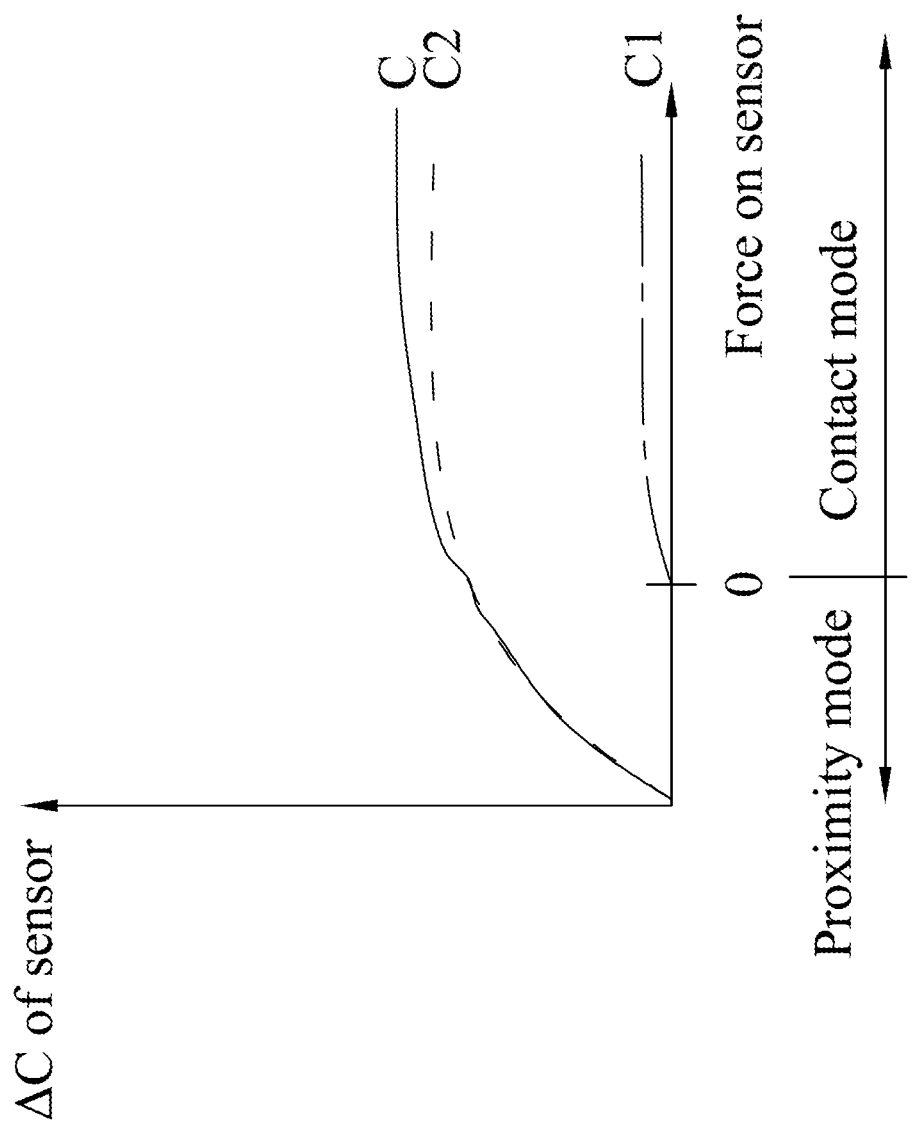
Figure 2E:
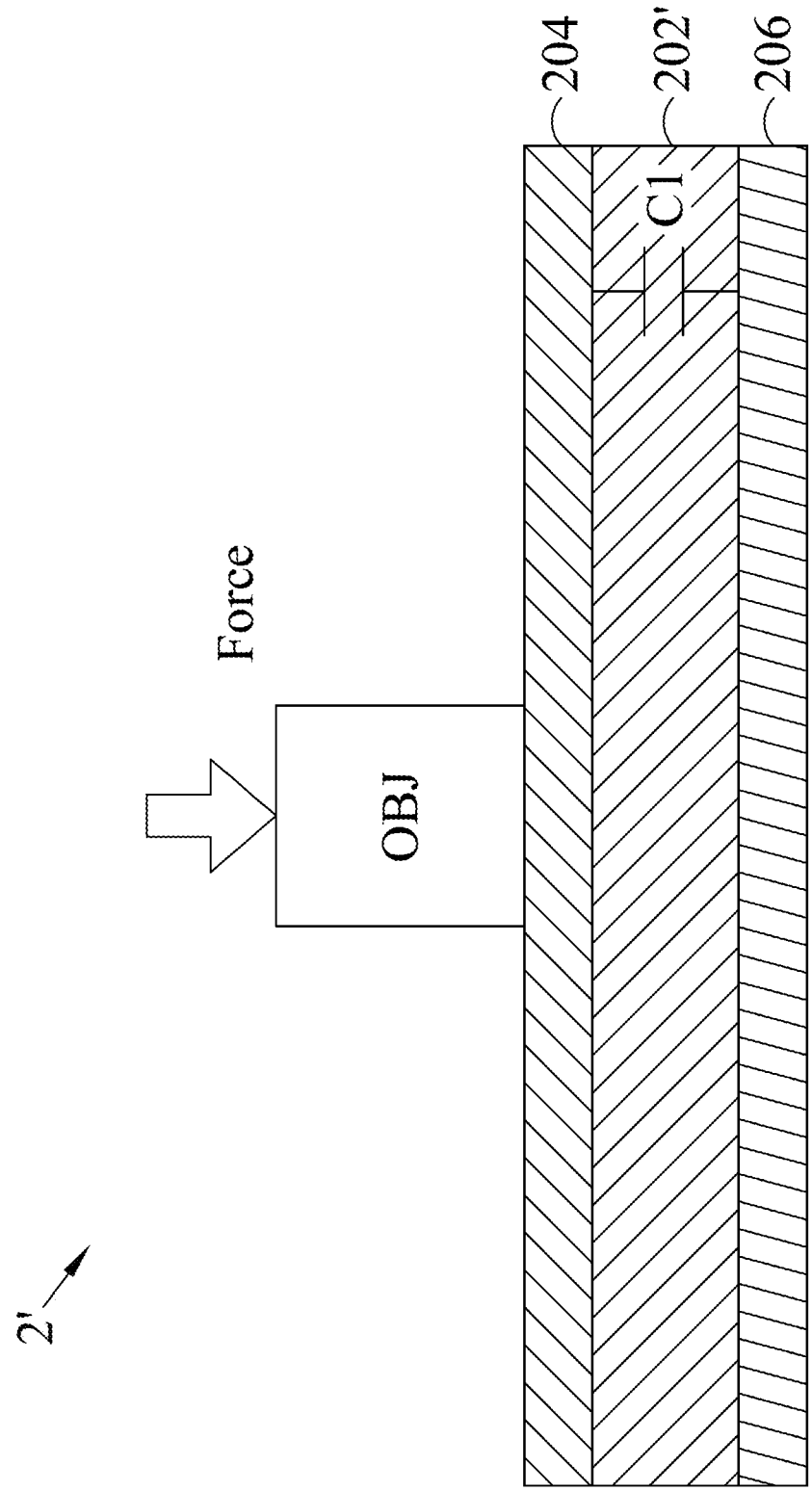
Figure 2F:
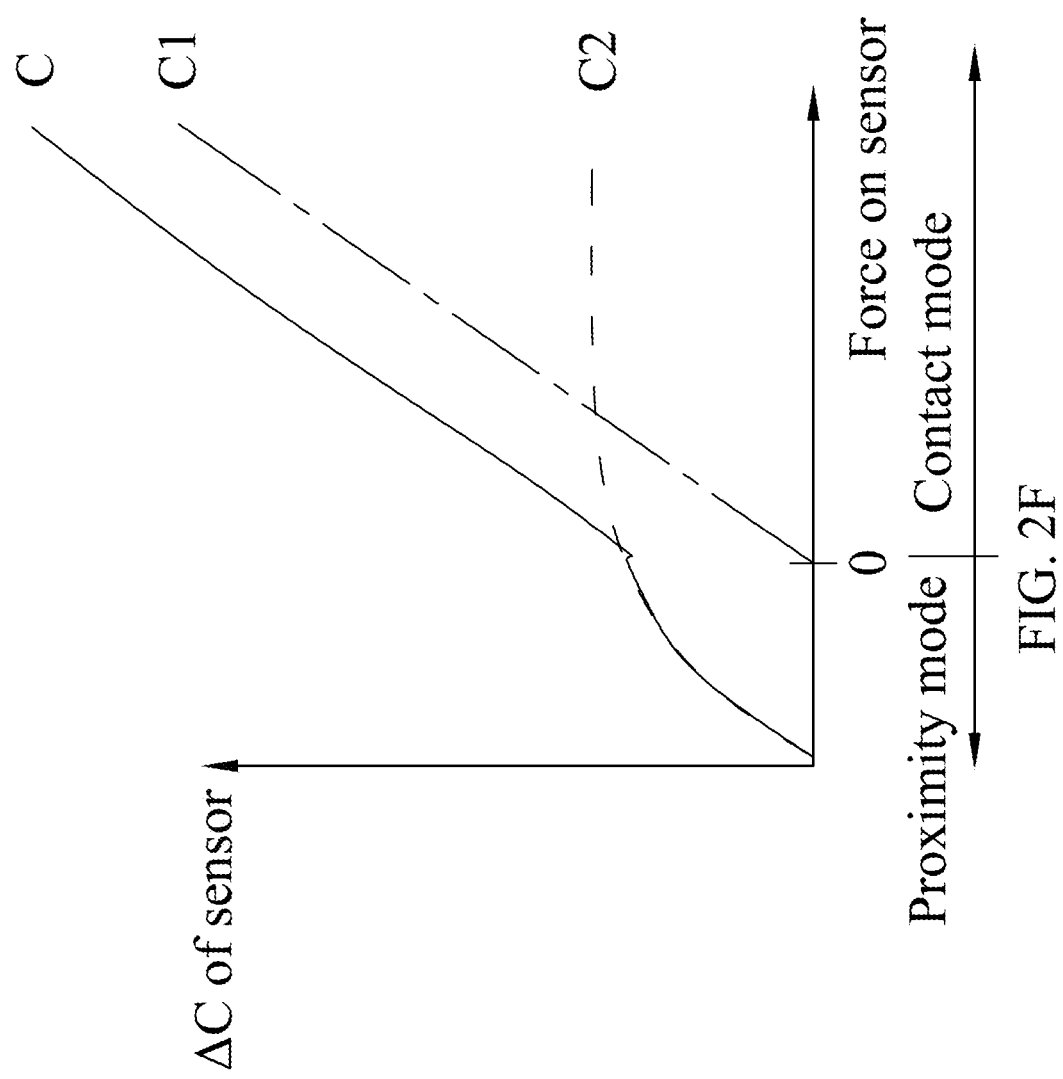
Figure 2G:
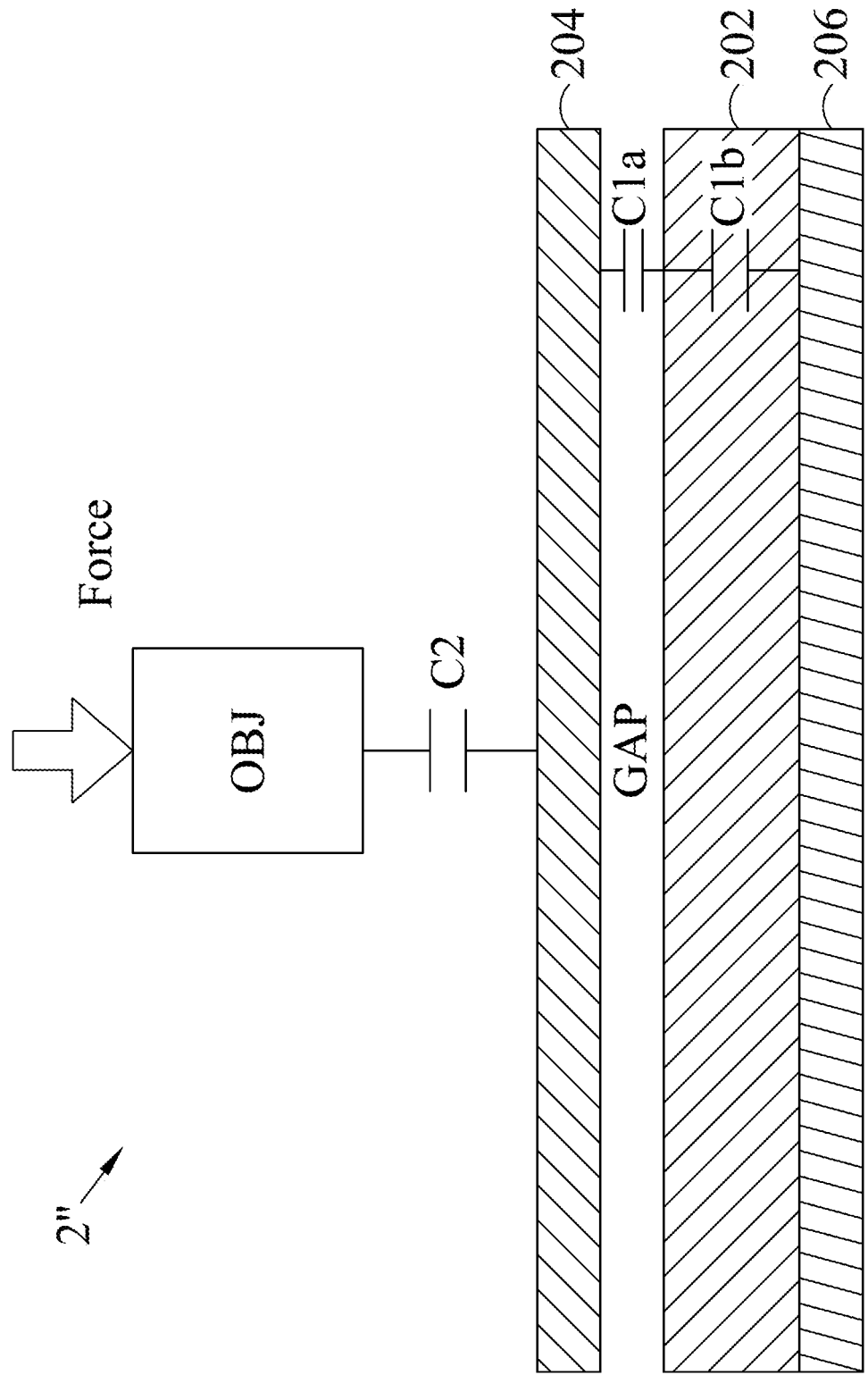
Figure 2H:
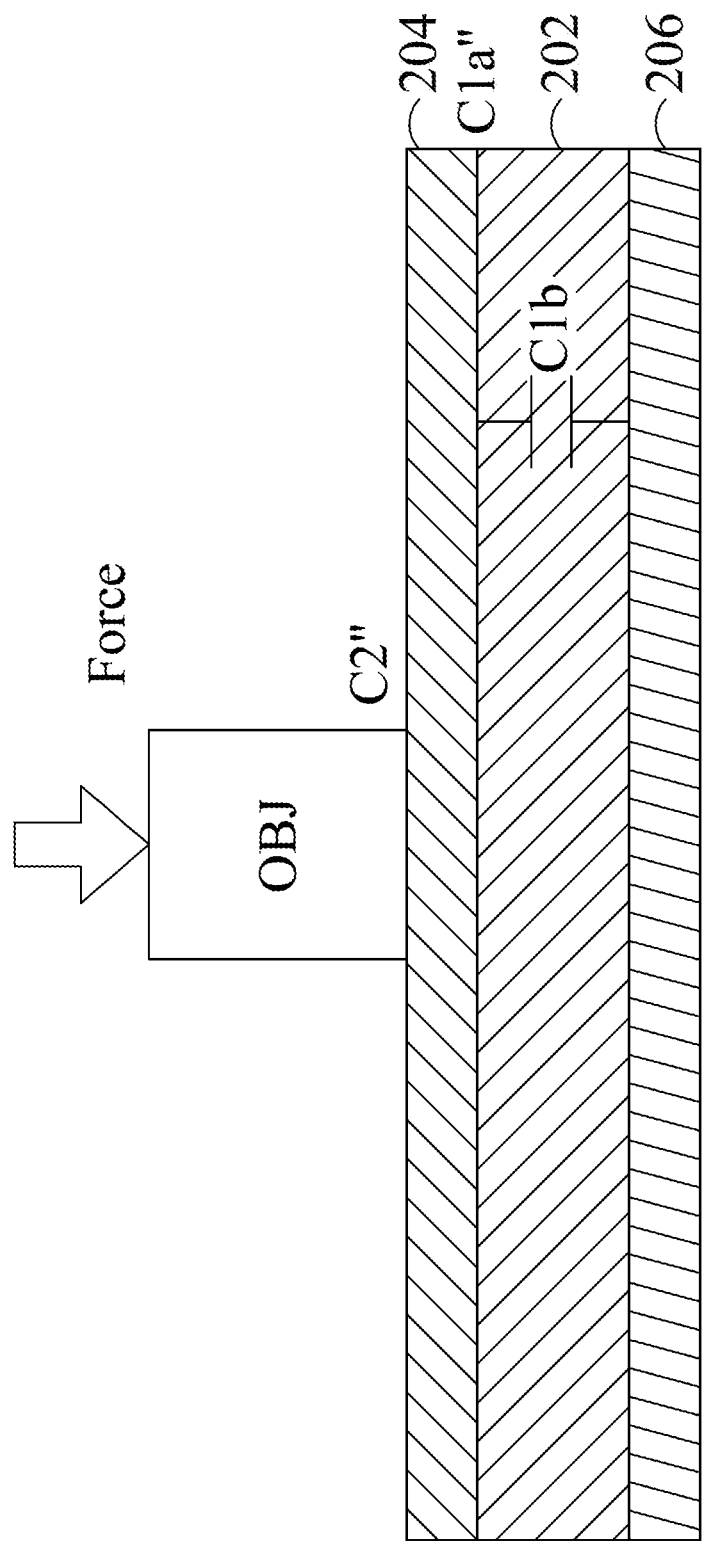
Figure 2I:
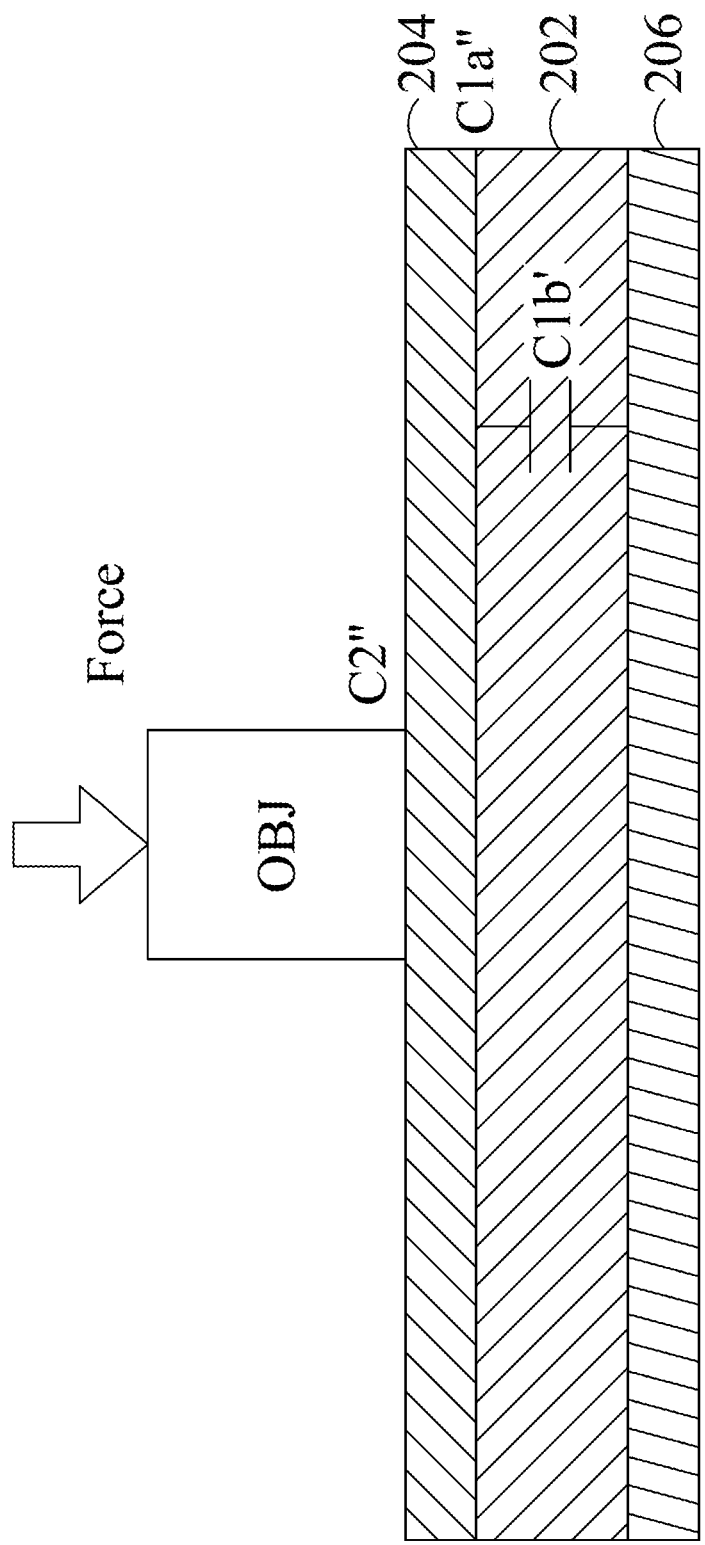
Figure 2J:
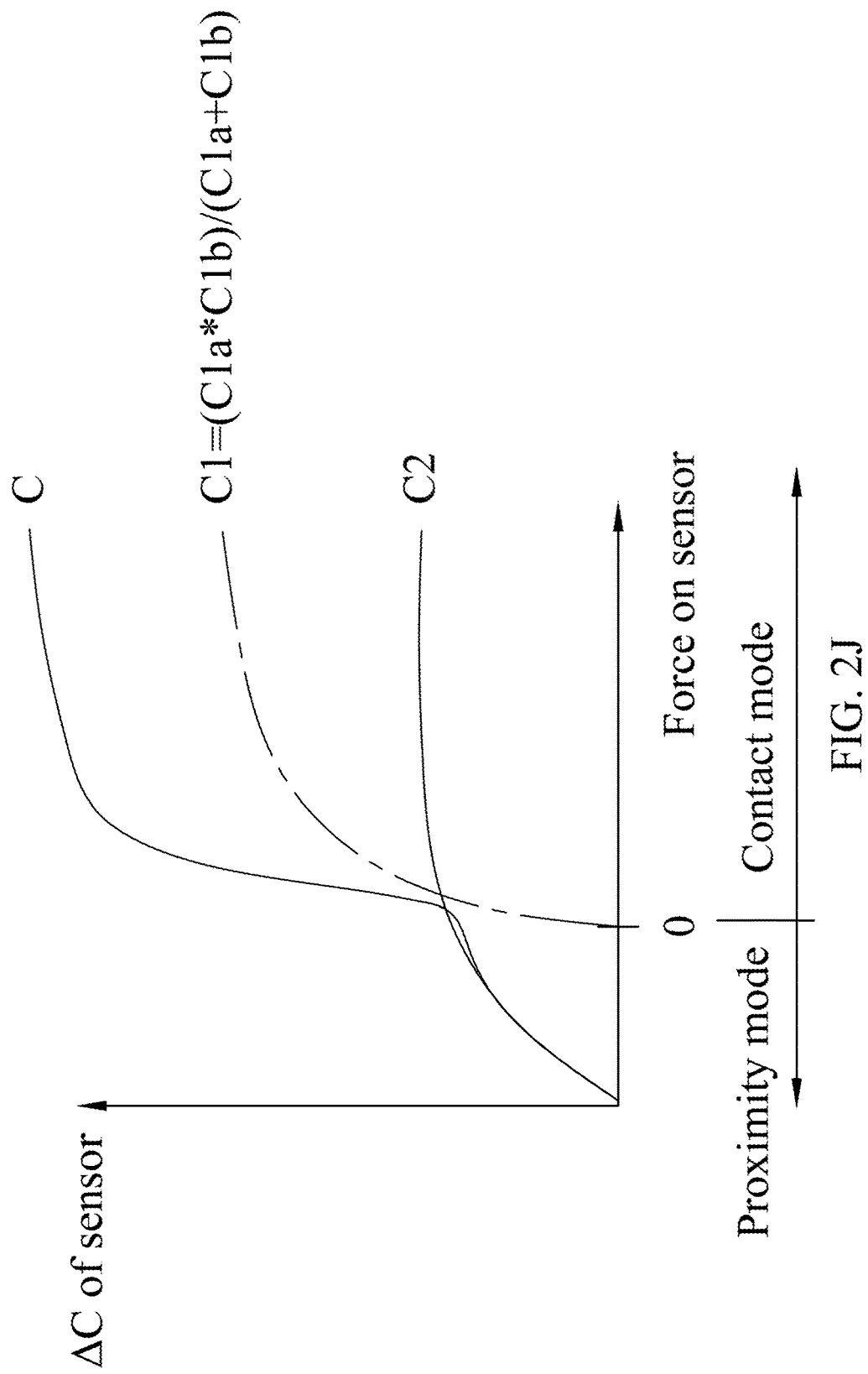
Figure 2K:
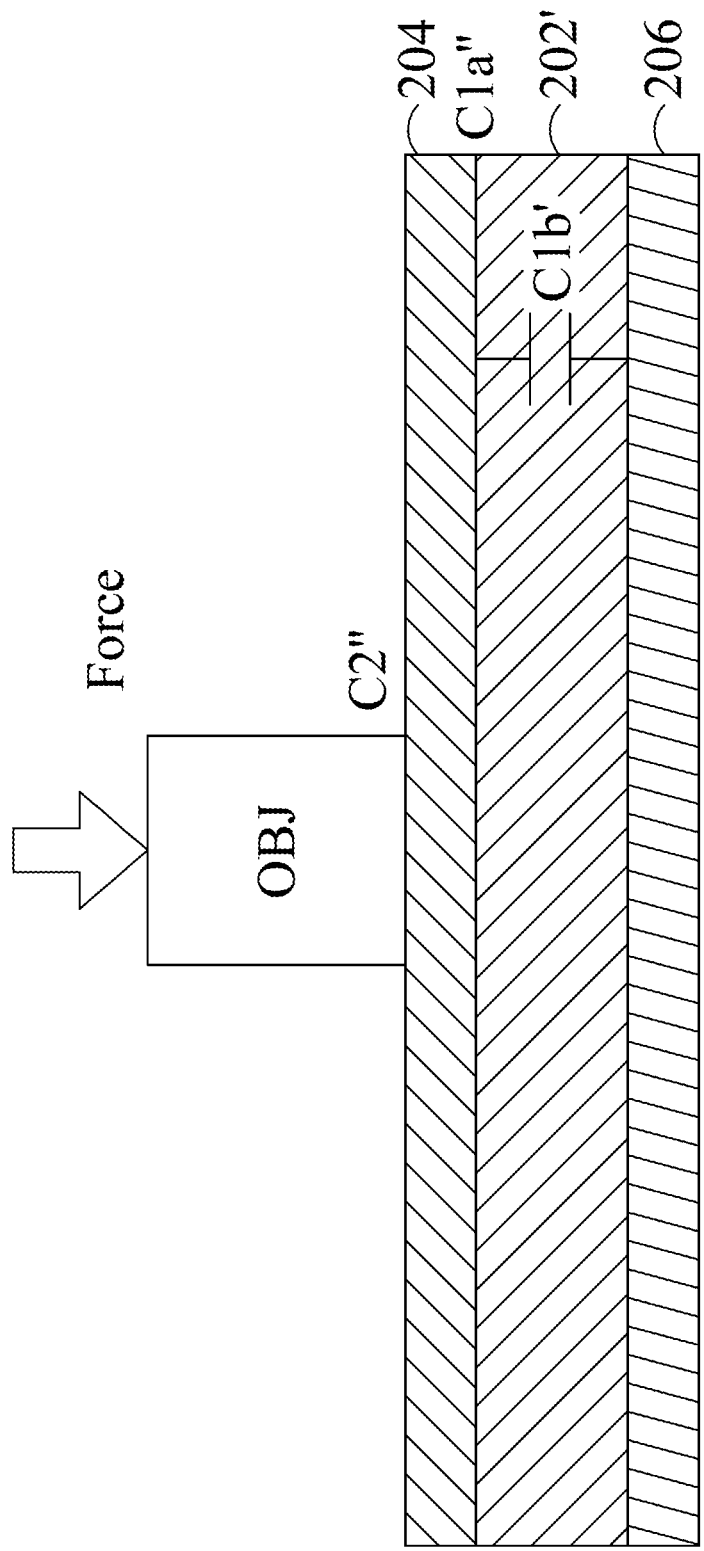
Figure 2L:
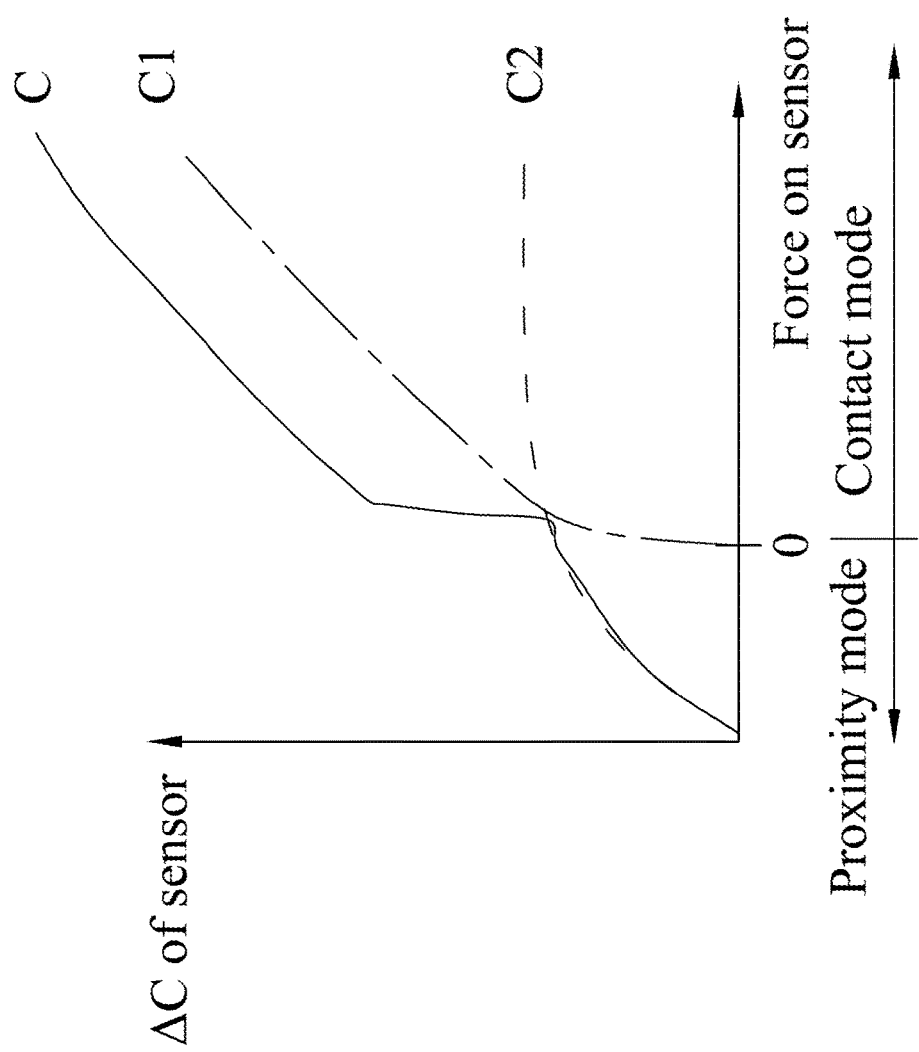
Figure 2M:
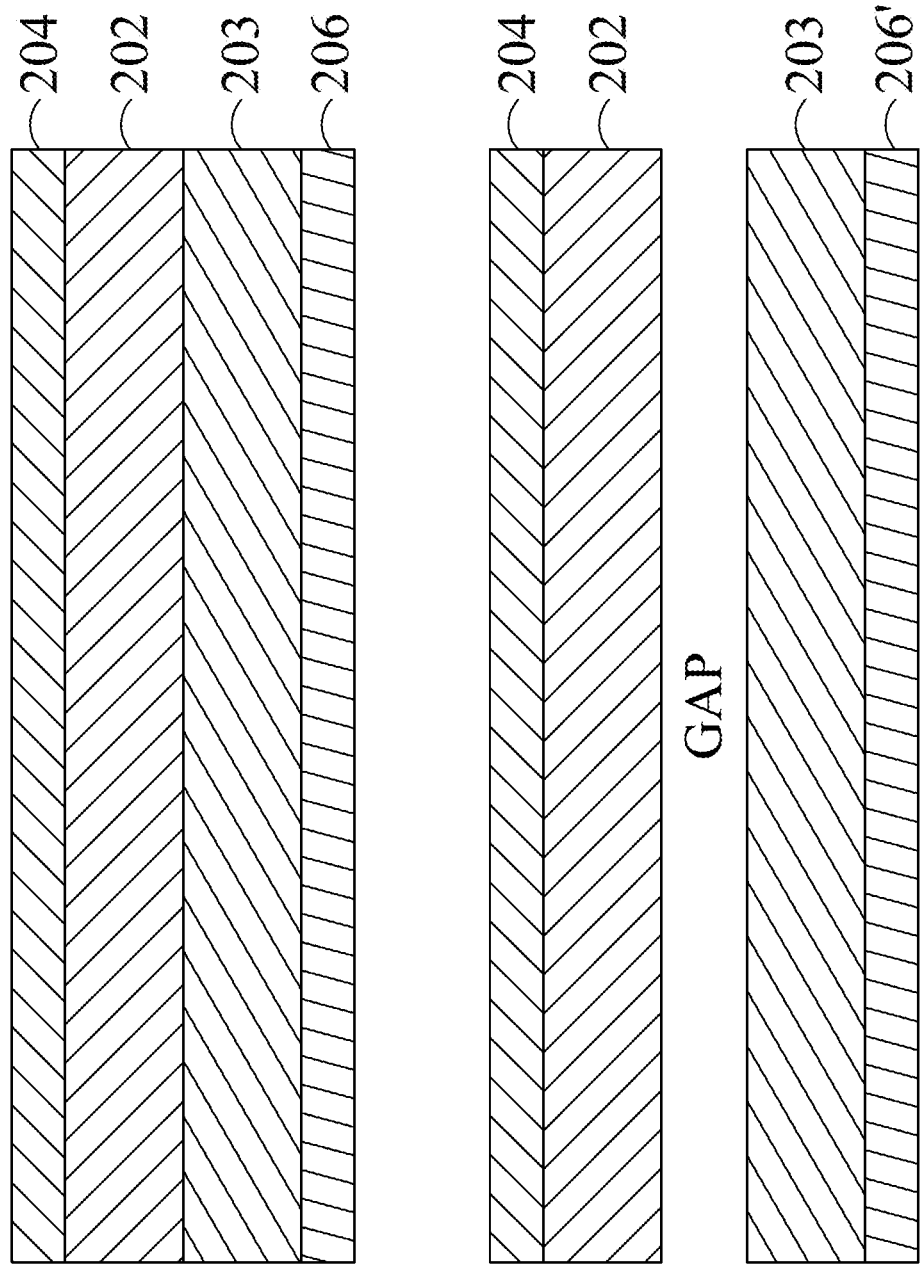
Figure 2N:
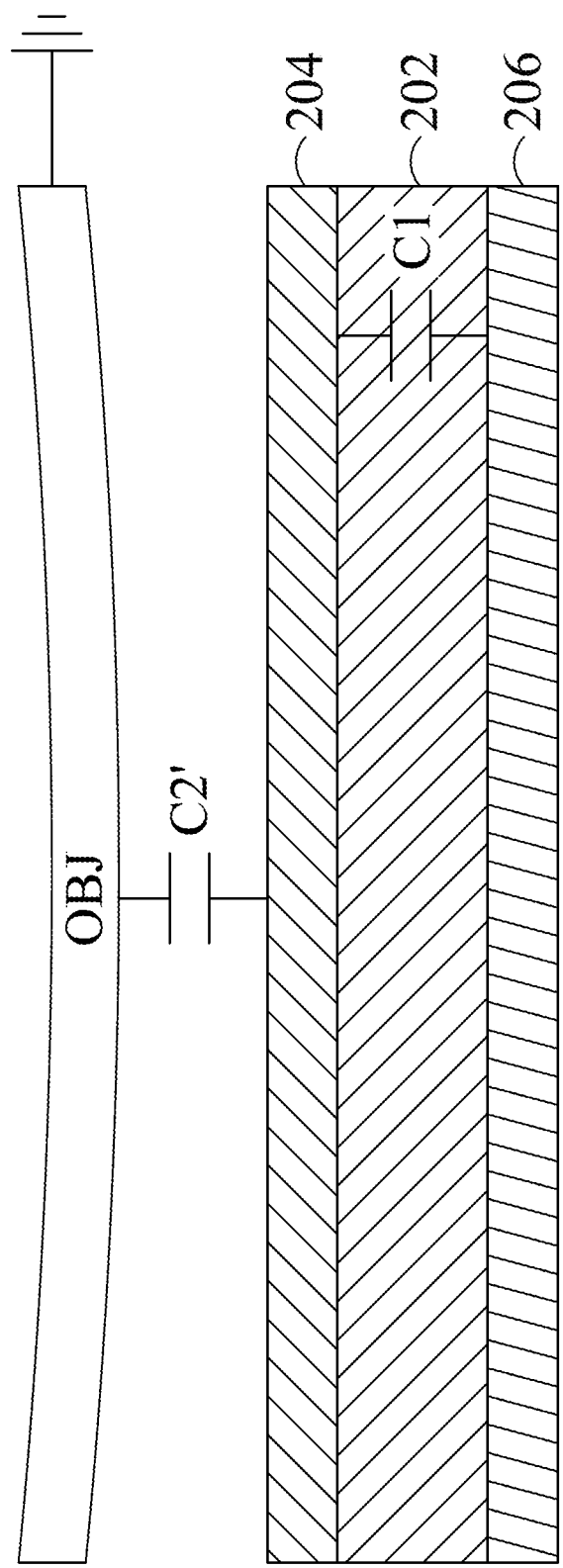
Figure 2O:
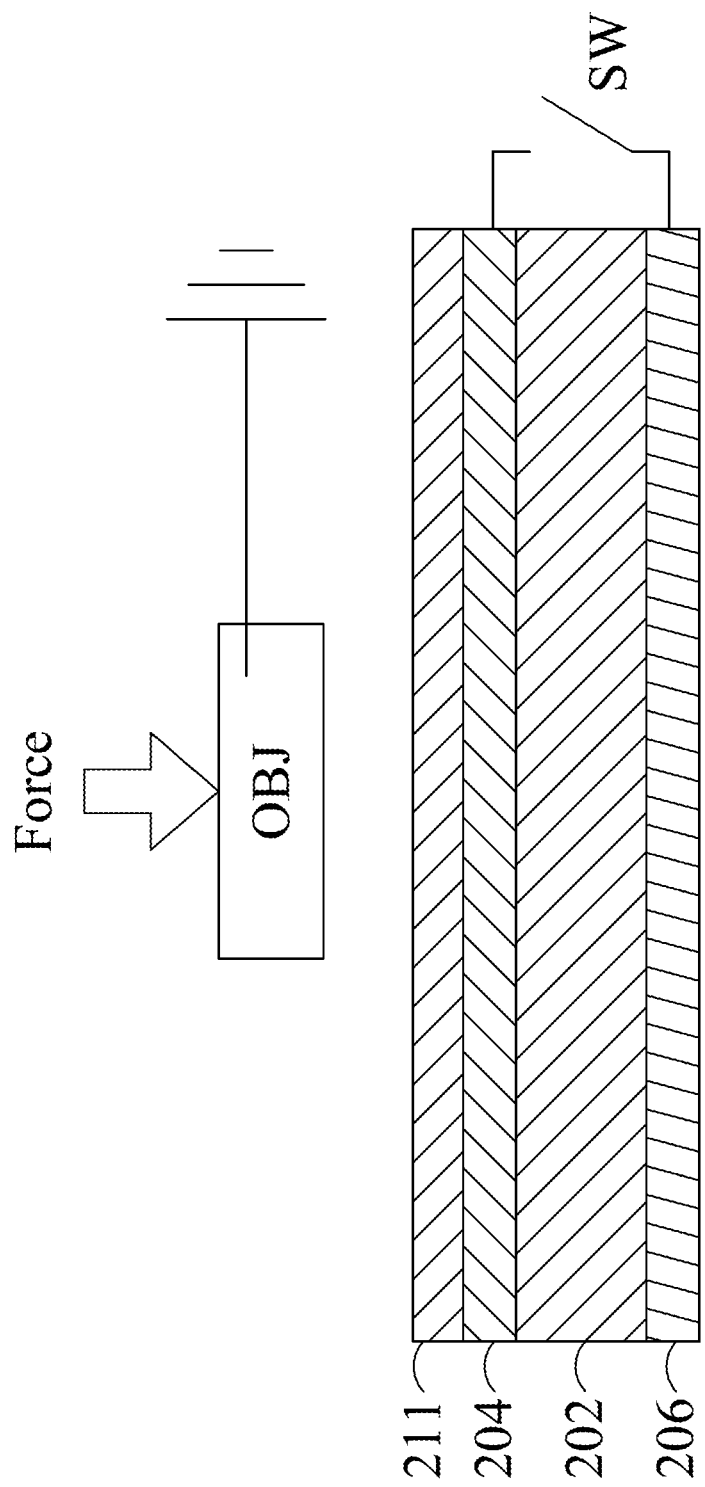

Please refer to FIGS. 2A-2O, those are schematic diagrams and plots of capacitance versus force on the sensor of the second embodiments of a force sensing structure of the present disclosure. As shown in the FIGS. 2A-2C, a force sensing structure 2 includes a first capacitance material layer 202, a first electrode 204, and a second electrode 206. The first capacitance material layer 202 is disposed between the first electrode 204 and the second electrode 206. When the force is applied to the object OBJ, which sequentially approaches the force sensing structure 2, the second capacitance C2 sequentially changes to C2' and C2", and the first capacitance C1 changes to C1' as the thickness of the first capacitance material layer 202 decreased, as shown from FIGS. 2A to 2C, and the relationship between the capacitance variation ΔC and the applied force of the total capacitance C, the first capacitance C1, and the second capacitance C2 can be plotted in FIG. 2D. Therefore, the proximity of the object OBJ and the force applied on the object OBJ can be determined according to the capacitance variations.

Similar to FIGS. 1D and 1I, the first capacitance material layer 202 may also be replaced by a piezo-capacitance material layer 202' in the force sensing structure 2', such that the characteristic of the capacitance variation ΔC v.s the force on sensor can be changed. For example, when the object OBJ contacts the force touch structure 2' and changes the thickness of the piezo-capatance material layer 202', the force touch structure 2' is configured to detect the force applied by the object OBJ according to the capacitance variation of the first capacitance C1, which has linear relationship with a magnitude of the applied force, as shown in FIG. 2F.

Furthermore, according to FIG. 2G, an air gap GAP is inserted between the first electrode 204 and the first capacitance material layer 202 of the force sensing structure 2", and a gap capacitance C1a and a first capacitance C1a are formed therebetween. As the force is applied to the object OBJ, which approaches the first electrode 204, the second capacitance C2 is changed to C2", and the first electrode 204 comes in to contact the first capacitance material layer 202, such that the gap capacitance C1a is changed to C1a". After the thickness of the first capacitance material layer 202 is decreased due the applied force, the first capacitance C1b is changed to C1b'. Here, the capacitance characteristic of the air gap GAP can be adjusted by the characteristic of the first capacitance material layer 202, where the gap capacitance C1a and the capacitance material layer 202 are in series, the total capacitance C can be calculated by the equation C=(C1a*C1b)/(C1a+C1b)C2.

In detail, the gap variation between the object OBJ and the capacitive material layer 202 and the gap variation between the first electrode 204 and the first capacitor material layer 202 can be sensed by the force sensing structure, and the change of the force applied on the object OBJ may also be sensed thereby. Therefore, the type of the capacitance measurement circuit should be a combination of self-capacitance and mutual capacitance.

Similarly, the first capacitance material layer 202 can be replaced by a piezo-capacitance material layer 202' in the force sensing structure 2''', and the characteristic of the capacitance variation ΔC v.s the force on sensor can be changed. For example, when the object OBJ contacts the force touch structure 2''' and changes the thickness of the piezo-capatance material layer 202', the force touch structure 2''' is configured to detect the force applied by the object OBJ according to the capacitance variation of the first capacitance C1b, which has linear relationship with a magnitude of the applied force, as shown in FIGS. 2K and 2L.

Please refer to FIGS. 2M and 2L, in other embodiments of the force sensing structure, which may further include a second capacitance material layer 203, and the air gap GAP can also be inserted between the first capacitance material layer 202 and the second capacitance material layer 203. Therefore, the proximity of the object OBJ and the force applied to the object OBJ can be detected similarly. Note that the object OBJ can be plate-shaped and flexible, as two ends of the object OBJ are fixed, a part of the object OBJ is curved by the applied force to change the second capacitance C2 to C2', hence the applied force can be detected.

Please refer to FIG. 2O, the force sensing structure further includes an insulating layer 211, and a switch SW electrically connected between the first electrode 204 and the second electrode 206. When the switch SW is closed and the object is grounded, the first electrode 204 is shorted with the second electrode 202, the force touch sensor is configured to detect the force applied to the object OBJ according to the capacitance variation between the first electrode 204 and the second electrode 206. When the switch SW is open and the first electrode 204 is grounded, the force touch sensor can be configured to detect the proximity of the object OBJ according to the capacitance variation between the object OBJ and the first electrode 204 by using a self-capacitive detection, and to detect the force applied to the object OBJ according to the capacitance variation between the second electrode and the first capacitance material layer.

Figure 3A:
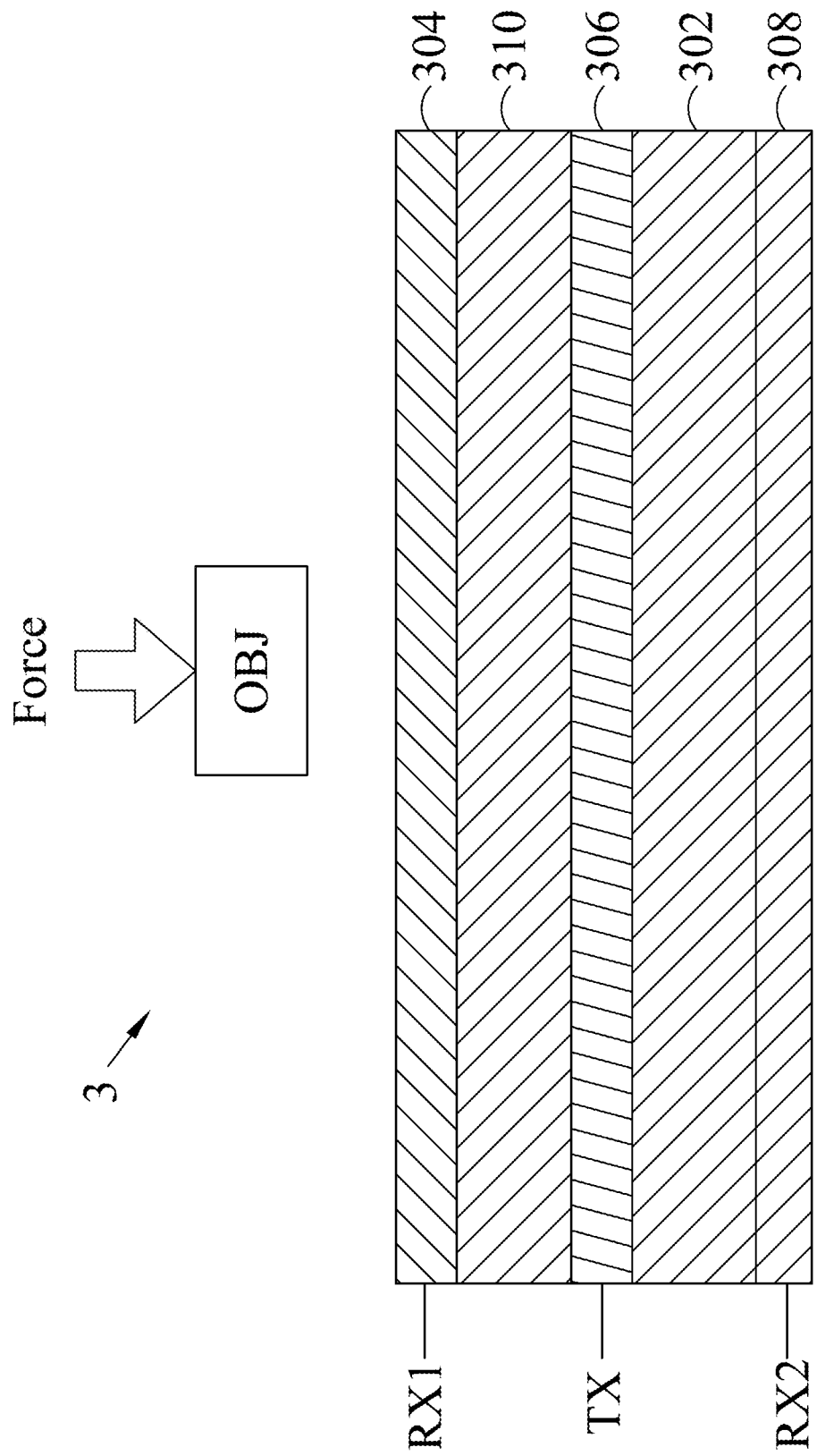
FIGS. 3A-3F is schematic diagram of the third embodiments of a force sensing structure of the present disclosure.

FIG. 3A to 3F are schematic diagrams of the third embodiment of a force sensing structure of the present disclosure. As shown in FIG. 3A, a force sensing structure 3 sequentially includes a first electrode 304, an insulating layer 310, a second electrode 306, a capacitance material layer 302, and a third electrode 308. By utilizing the mutual capacitive detection between the first electrode 304 and the second electrode 306 to detect object position information, and between second electrode 306 and the third electrode 308 to detect applied force by object, and the repeated description is omitted.

For example, the first electrode 304 may be connected to the first receiving terminal RX1, the second electrode 306 may be connected to the transmitting terminal TX, and the third electrode 308 may be connected to the second receiving terminal RX. In the configuration, when the force is applied to the object to approach the first electrode 304, the position of the force is able to be detected by utilizing the mutual capacitive detection between the first electrode 304 and the second electrode 306, and when the object OBJ contacts the first electrode 304 and applies at least a portion of the force to the capacitance material layer 302, the applied force is able to be detected by utilizing the mutual capacitive detection between the second electrode 306 and the third electrode 308.

Figure 3B:
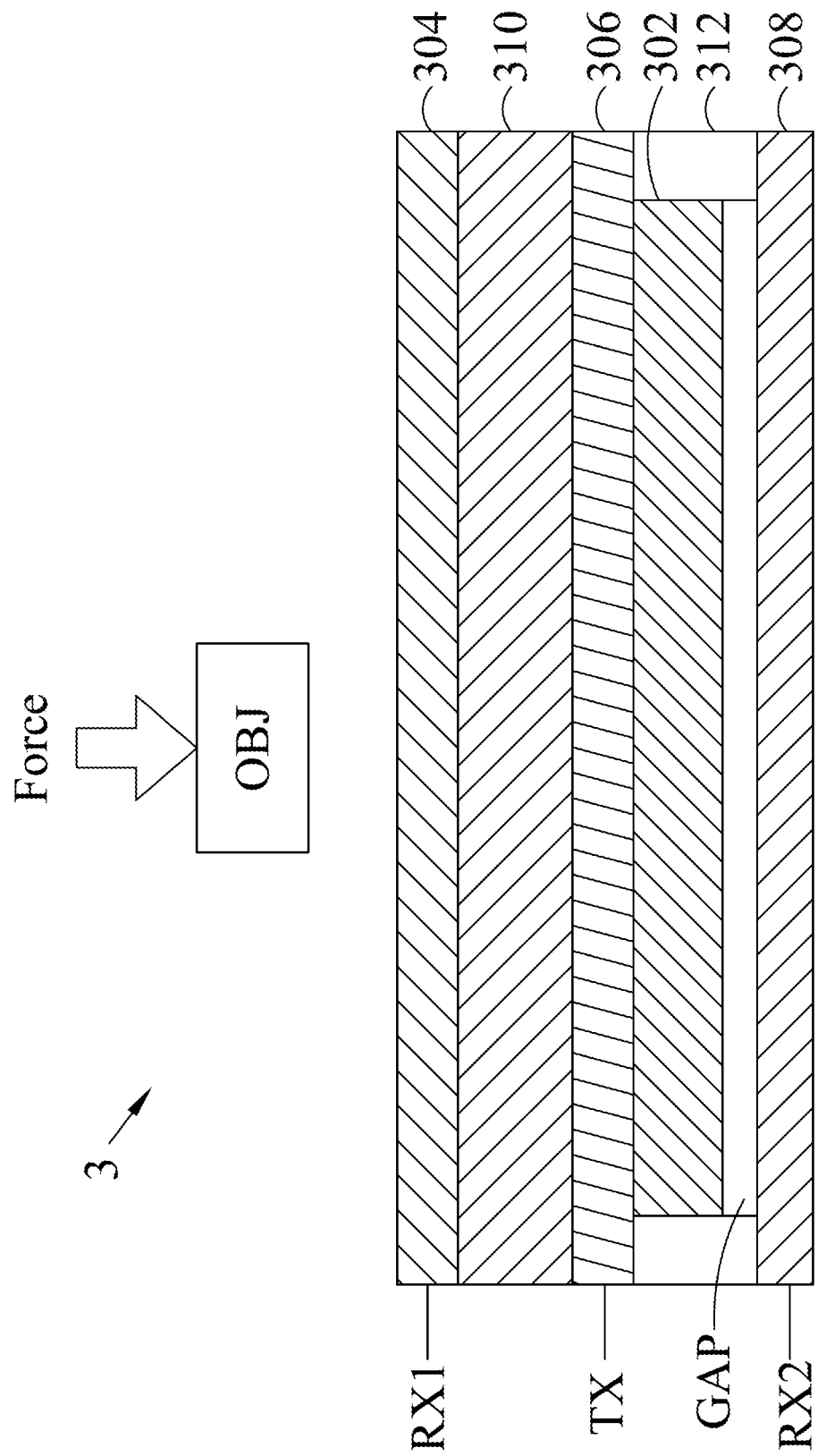

Please refer to FIG. 3B, which is another schematic diagram of the third embodiment of a force sensing structure of the present disclosure. As shown in FIG. 3B, the third electrode 308 is further separated from the capacitance material layer 302 with an air gap GAP, and two spacer 312 is disposed in a periphery region thereof for supporting the second electrode 306. Similar to the embodiment described above, the first electrode 304 may be connected to the first receiving terminal RX1, the second electrode 306 may be connected to the transmitting terminal TX, and the third electrode 308 may be connected to the second receiving terminal RX. In the configuration, when the force is applied to the object to approach the first electrode 304, the position of the force is able to be detected by utilizing the mutual capacitive detection between the first electrode 304 and the second electrode 306, and when the object OBJ contacts the first electrode 304 and applies at least a portion of the force to the capacitance material layer 302, the applied force is able to be detected by utilizing the mutual capacitive detection according to differences of the capacitance material layer 302 and the air gap GAP between the second electrode 306 and the third electrode 308.

Figure 3C:
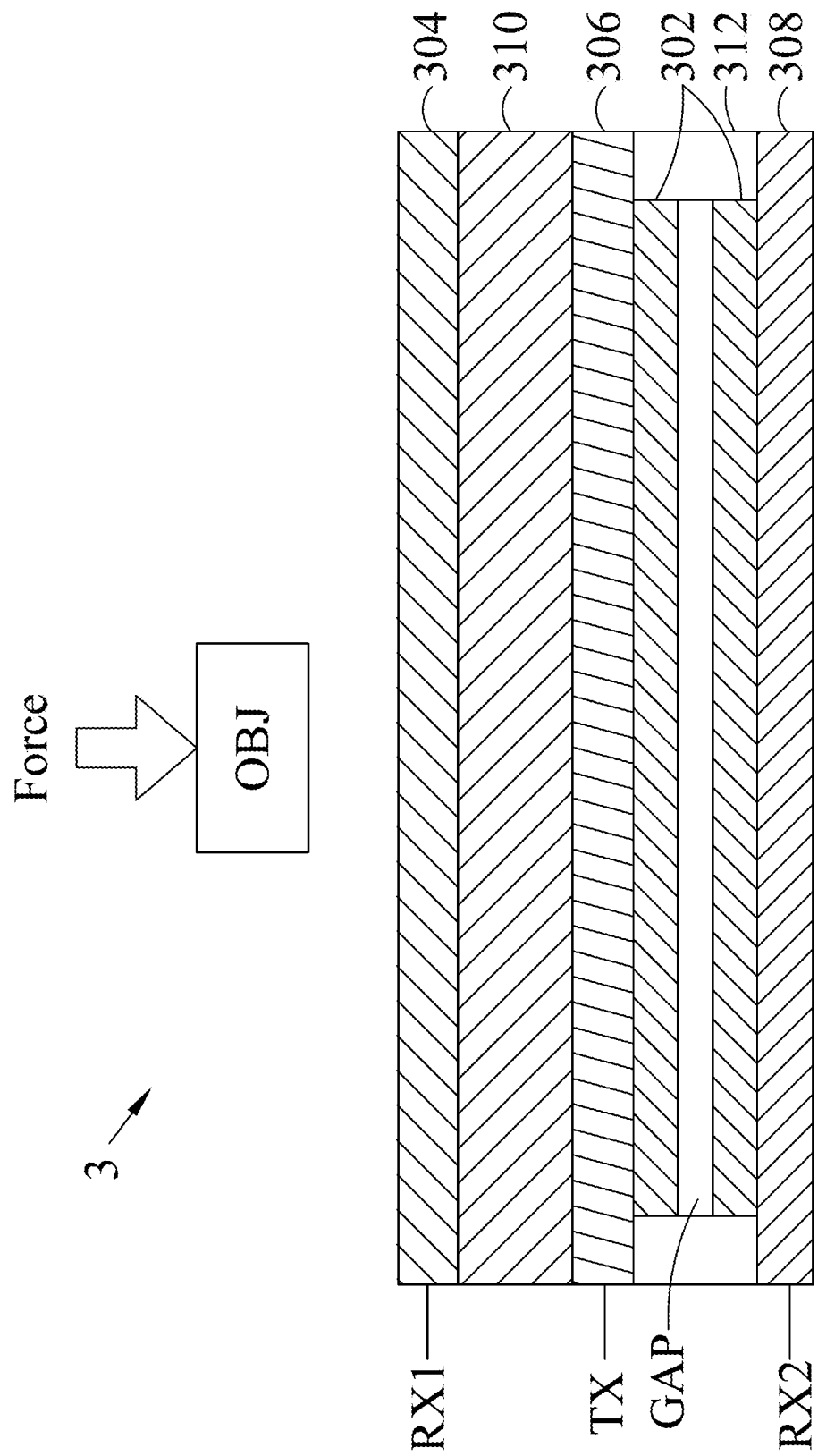

Further refer to FIG. 3C, which is similar to FIG. 3B despite that the air gap GAP is interposed between two capacitance material layers 302. Similarly, the first electrode 304 may be connected to the first receiving terminal RX1, the second electrode 306 may be connected to the transmitting terminal TX, and the third electrode 308 may be connected to the second receiving terminal RX. In the configuration, when the force is applied to the object to approach the first electrode 304, the position of the force is able to be detected by utilizing the mutual capacitive detection between the first electrode 304 and the second electrode 306, and when the object OBJ contacts the first electrode 304 and applies at least a portion of the force to the two capacitance material layers 302, the applied force is able to be detected by utilizing the mutual capacitive detection according to differences of the two capacitance material layers 302 and the air gap GAP between the second electrode 306 and the third electrode 308.

Figure 3D:
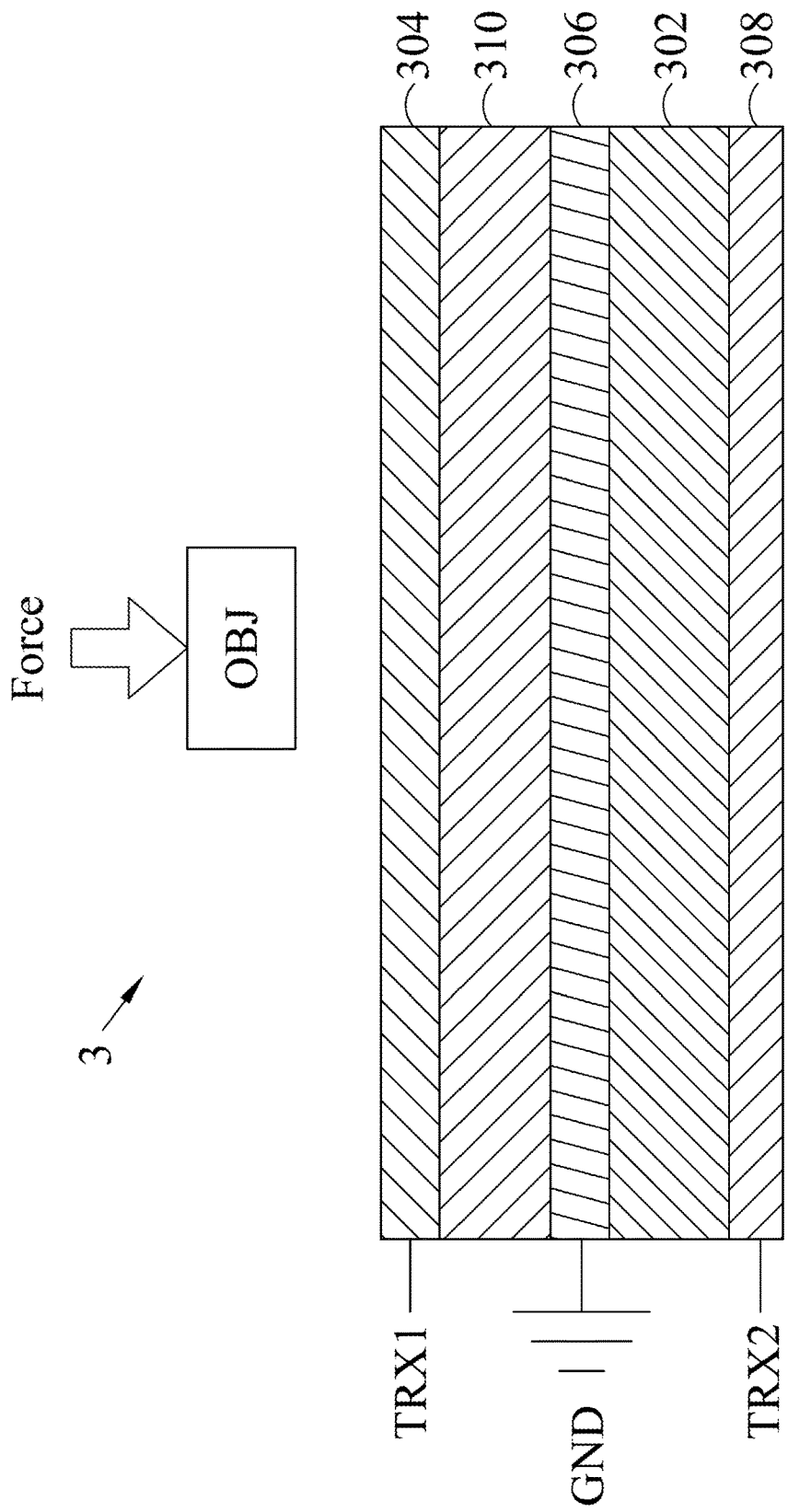

Please turn to FIG. 3D, which shows a modification of FIG. 3A. In FIG. 3D, the first electrode 304 may be connected to the first transmitting-receiving terminal TRX1, the second electrode 306 is grounded for isolating the detections of the first electrode 304 and the third electrode 308, and the third electrode 308 may be connected to the second transmitting-receiving terminal TRX2. In the configuration, when the force is applied to the object to approach the first electrode 304, the position (i.e., x and y positions of the applied force) of the force is able to be detected by utilizing the self-capacitive detection by the first electrode 304, and when the object OBJ contacts the first electrode 304 and applies at least a portion of the force to the capacitance material layer 302, the applied force (i.e., the force applied along the z-direction) is able to be detected by utilizing the self-capacitive detection by the third electrode 308. Note that the arrangement of the first, second, and third electrodes 304, 306, and 308 may be modified by utilizing the self-capacitive and mutual capacitive detections to implement the detections of the applied force in x, y, and z direction, respectively.

Figure 3E:
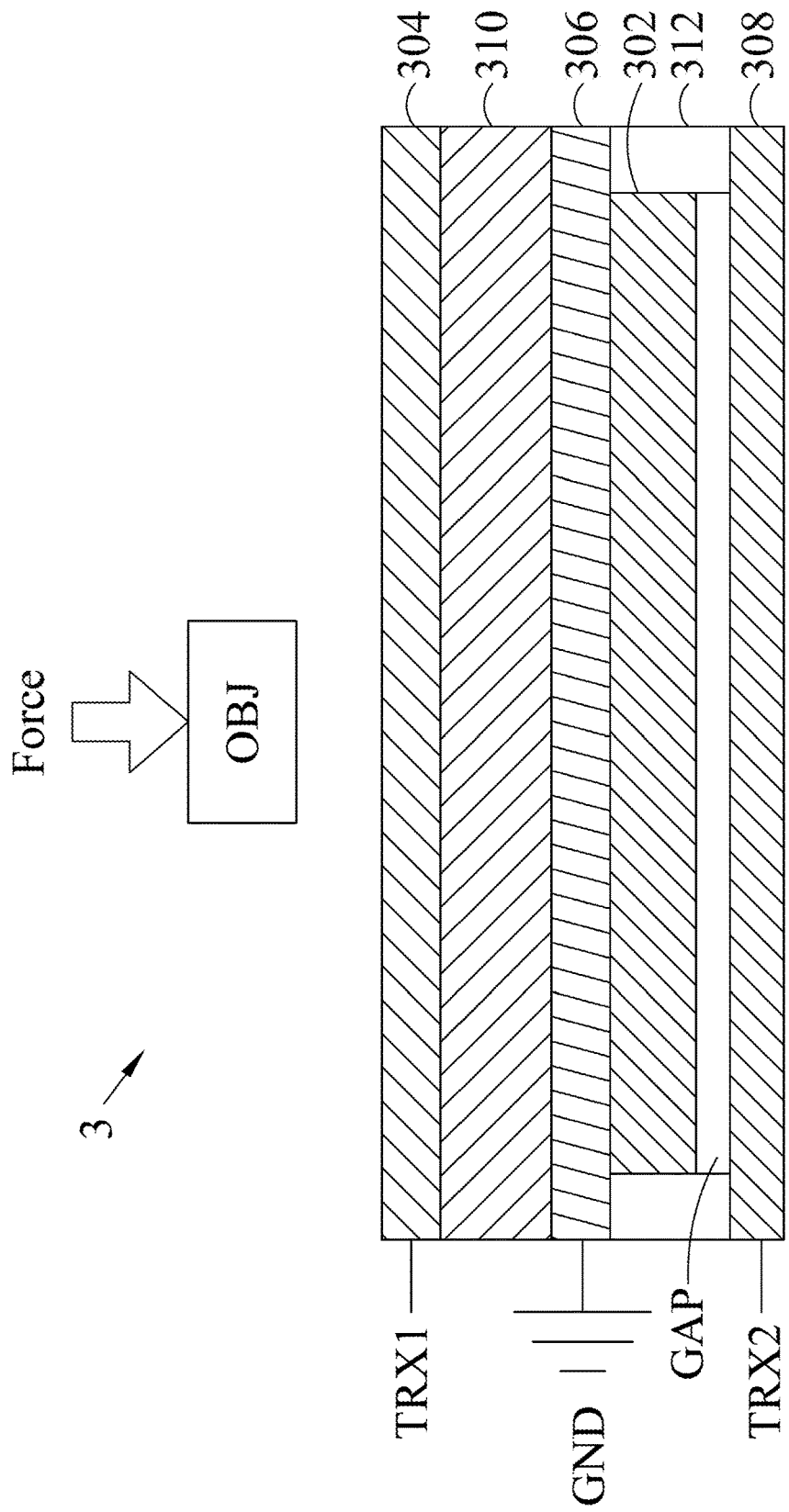
Figure 3F:
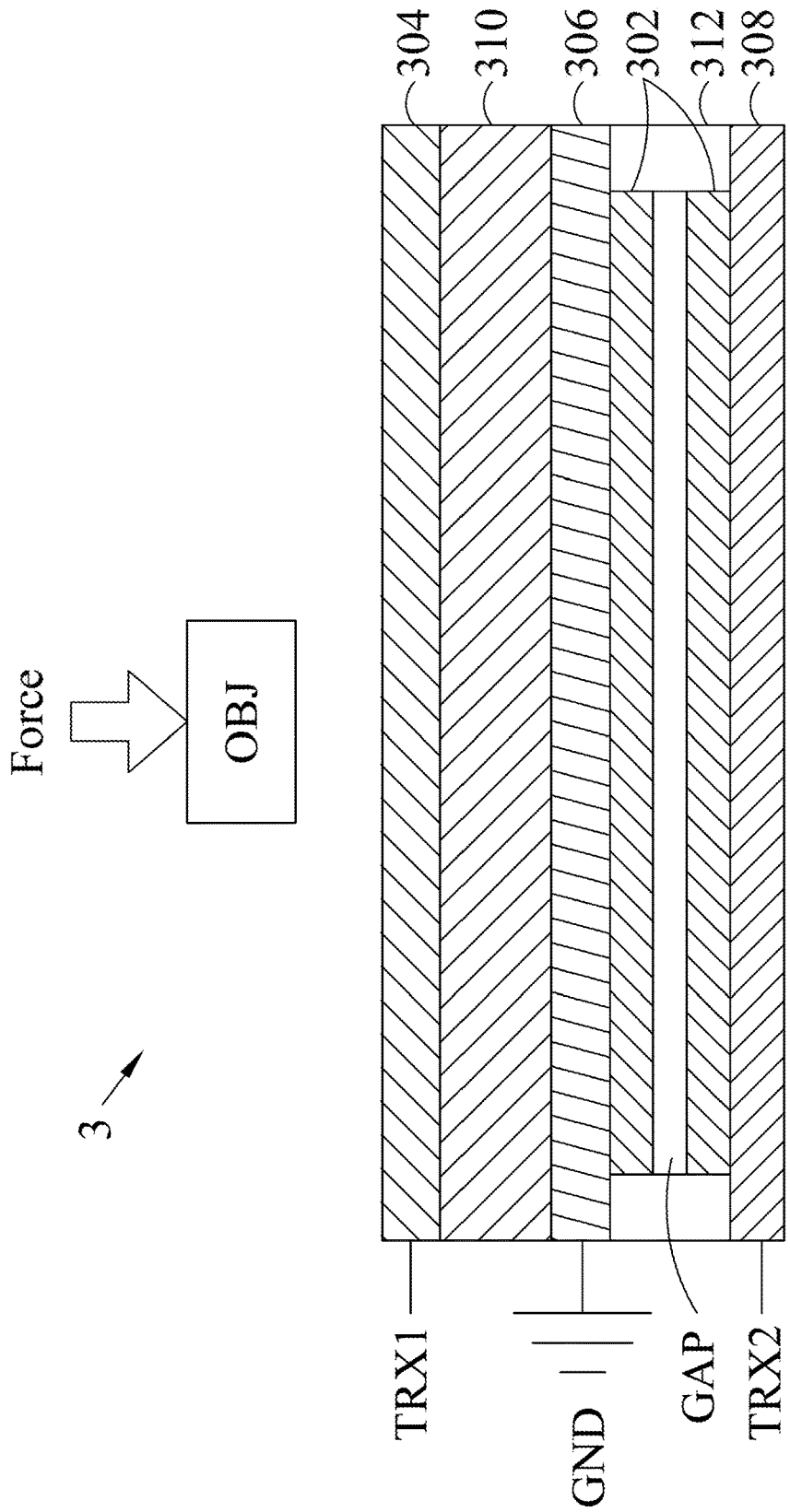

Similar to the modification of FIG. 3A in FIG. 3D, FIGS. 3B and 3C are further modified in a similar way as FIG. 3D, as shown in FIGS. 3E and 3F. The first electrode 304 is connected to the first transmitting-receiving terminal TRX1, the second electrode 306 is grounded for isolating the detections of the first electrode 304 and the third electrode 308, and the third electrode 308 may be connected to the second transmitting-receiving terminal TRX2. In the configuration, when the force is applied to the object to approach the first electrode 304, the position (i.e., x and y positions of the applied force) of the force is able to be detected by utilizing the self-capacitive detection by the first electrode 304, and when the object OBJ contacts the first electrode 304 and applies at least a portion of the force to the capacitance material layer 302, the applied force (i.e., the force applied along the z-direction) is able to be detected by utilizing the self-capacitive detection according to differences of the air gap GAP and the capacitance material layer(s) 302 by the third electrode 308.

Figure 4A:
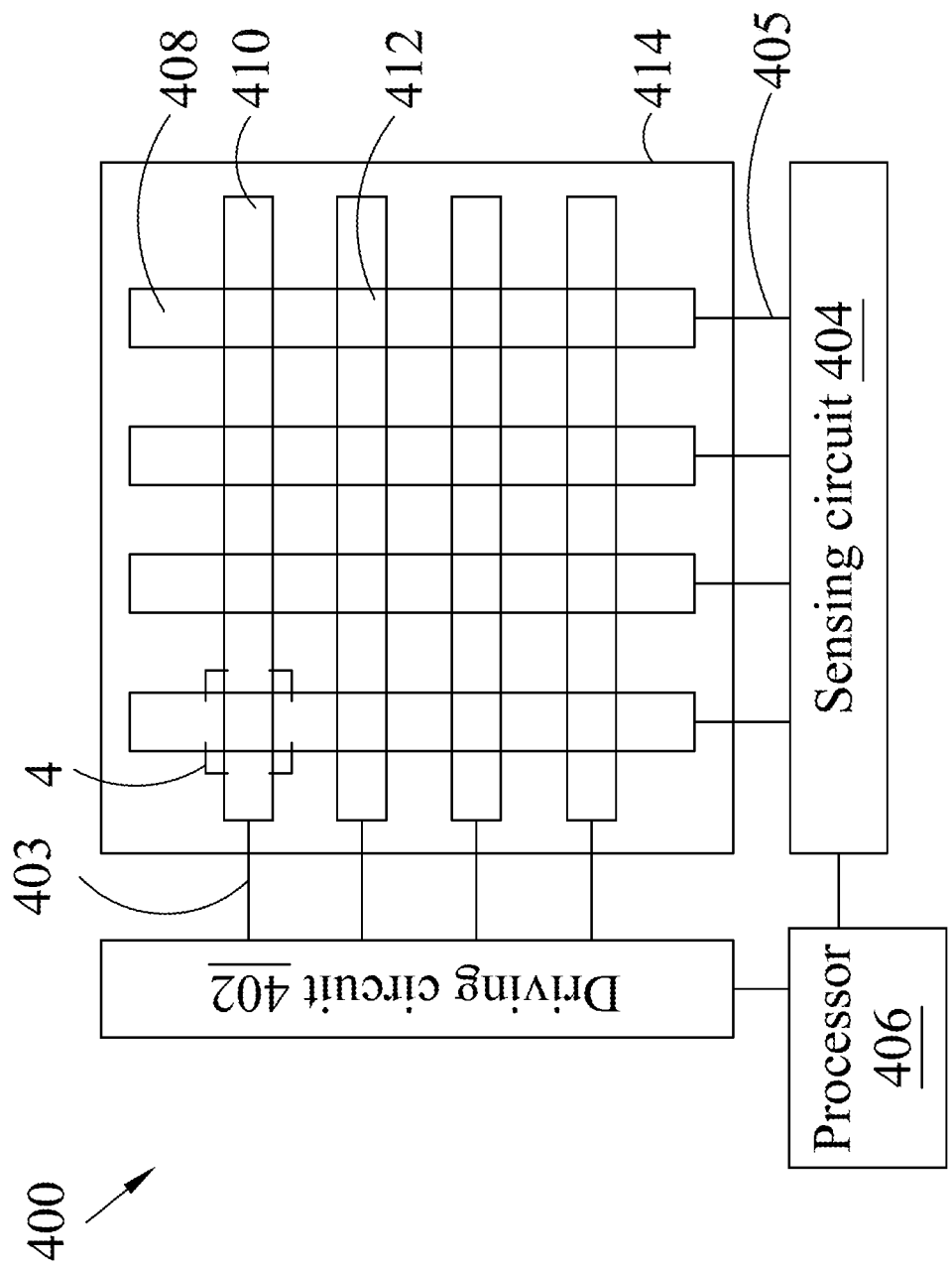
FIGS. 4A-4E are schematic diagrams of the first embodiments of a force sensing device of the present disclosure.

FIGS. 4A-4E are schematic diagrams of the first embodiment of a force sensing device of the present disclosure. As shown in FIG. 4A, a force sensing device 400 is provided. The force sensing device 400 includes a matrix 414 of sensor cells 4, a driving circuit 402, a sensing circuit 404, and a processor 406. The matrix 414 of sensor cells 4 is arranged in rows and columns and configured to detect a proximity of an object to the force sensing device 400 from an upside and a force applied by the object to the force sensing device 400, and each sensor cell 4 includes the force sensing structure mentioned above. The driving circuit 402 is coupled to each of the sensor cell 4 through a plurality driving lines 403 for sequentially applying the driving signals to the driving lines 403. The sensing circuit 404 is coupled to each of the sensor cells 4 through a plurality sensing lines 405. The sensing circuit 402 is configured to receive sensing signals generated by detecting a change in the first capacitance and the second capacitance sensed from each of the sensing cells 4.

Moreover, the processor 406 is for receiving the sensing signals from the sensing circuit 404 to determine touched positions, the proximities, and the applied force of the object. In the embodiment, the sensor cells 4' may be independent from each other, or the first electrodes 408 and the second electrodes 410 of the each rows and the each columns of the matrix 414 of sensor cells 4 may be co-used by corresponding sensor cells 4, and the capacitance material layers are at locations where the first electrodes 408 and the second electrodes 410 cross each other, and form a high force sensitivity regions 412.

Figure 4B:
Figure 4B:
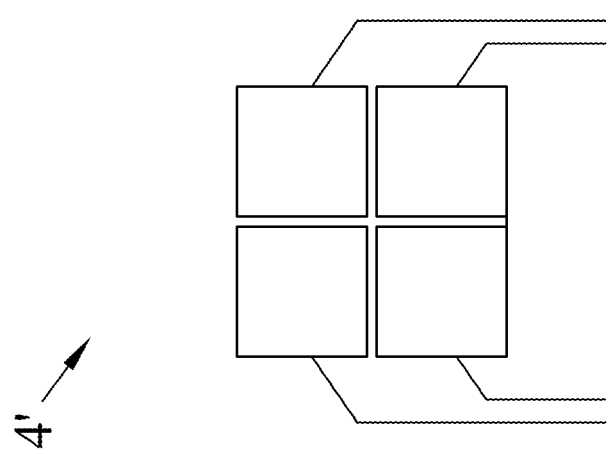

Furthermore, the plurality of the sensor cells 4" are able to be arranged parallel to each other, as shown in FIG. 4B. The layout of the single layer sensor cell 4" can be implemented as 1D or 2D array pattern for the multi-touch positioning and the force sensing system.

Figure 4C:
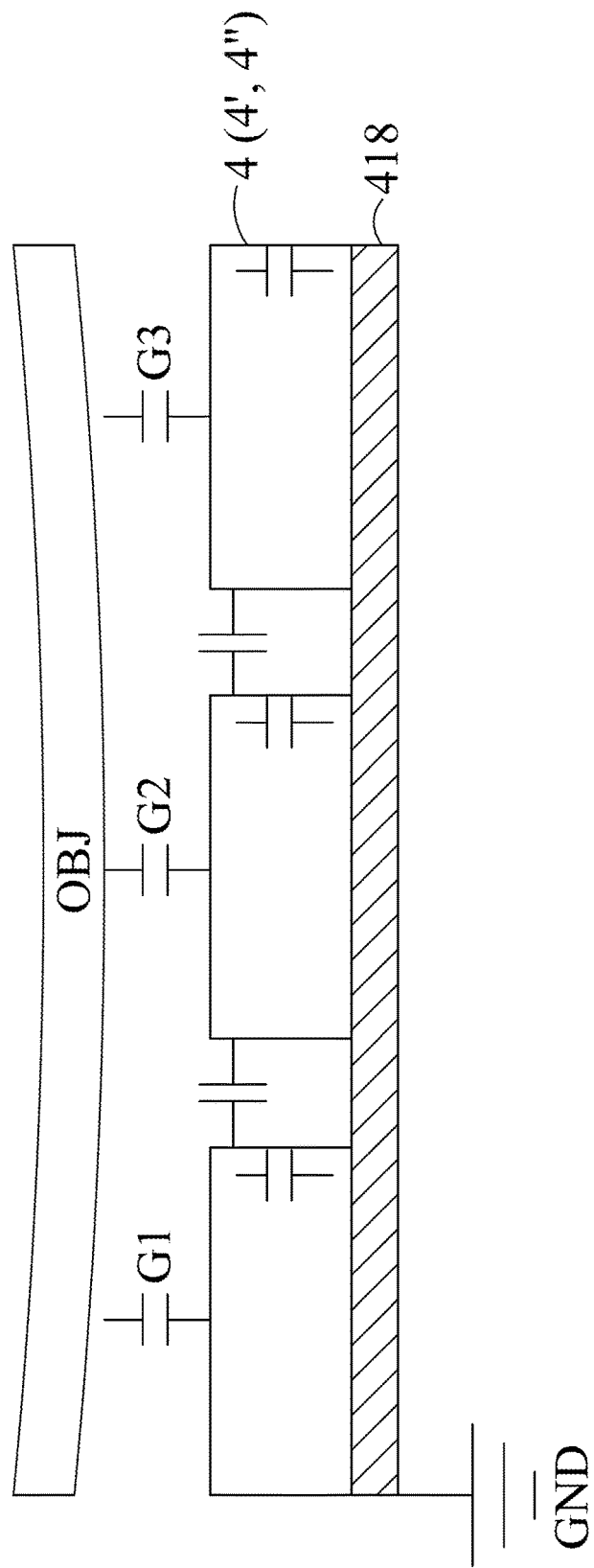
Figure 4D:
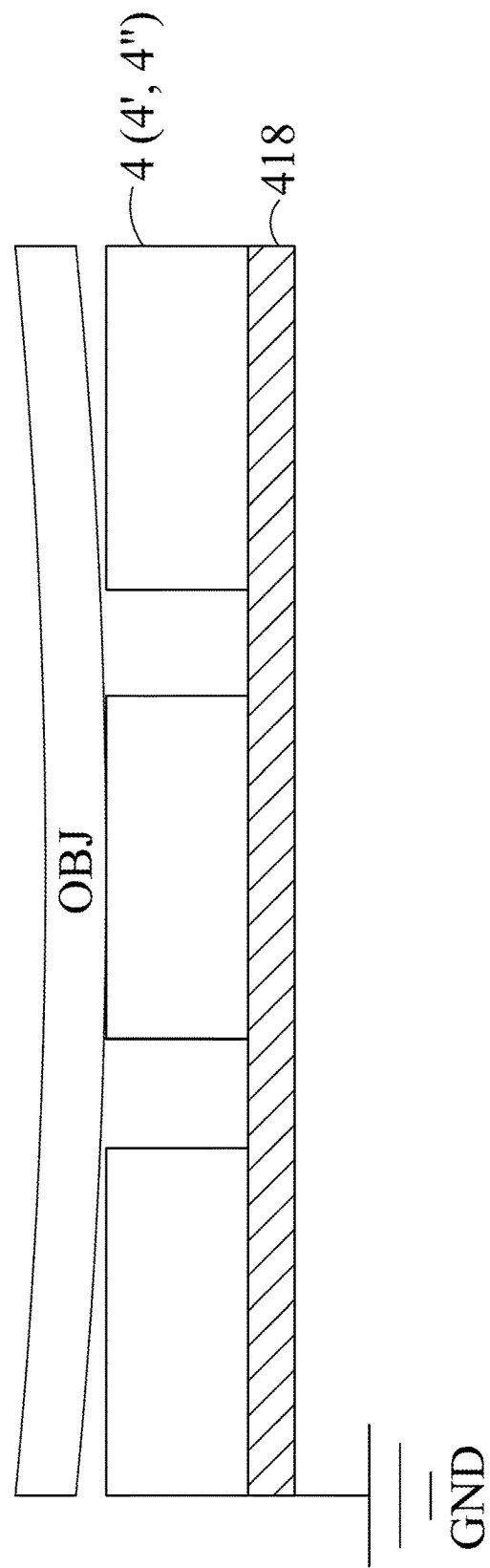
Figure 4E:
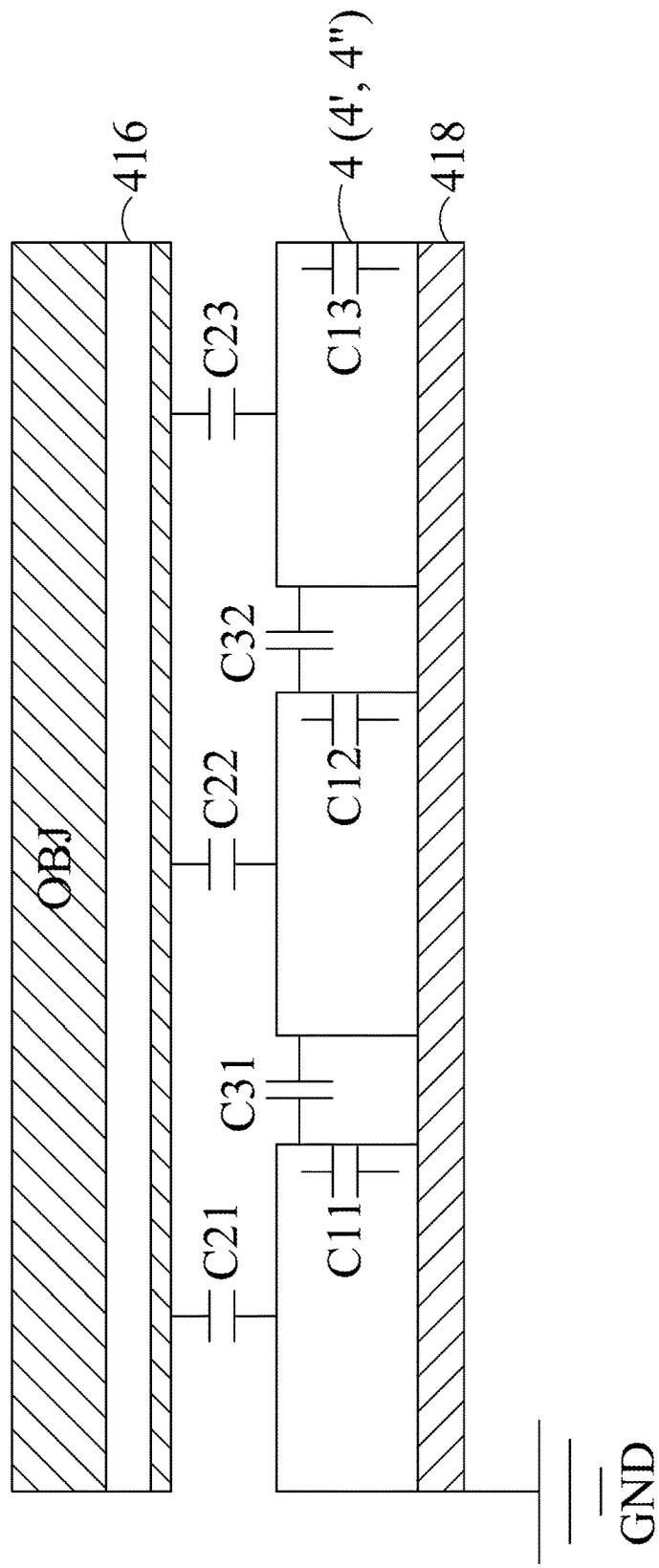

Please refers to FIGS. 4C-4E, those illustrate cross-section views of the force sensing device of the present application. Please refer to FIGS. 4C-4D, the above-mentioned force sensing structure may further be modified from that of FIG. 2A, where the plurality of first electrodes 408, the plurality of first capacitance material layers 412, and the second electrode 410 are optionally disposed and separated from each other to form the matrix 414 of the sensor cells 4, 4' or 4" on a base 418, where the base 418 may be an outside shell of the force sensing device 400 and can be grounded. Similarly, by using the mechanism of the proximity sensing, the gap variation between the object OBJ and the matrix 414 of the sensor cells 4, 4' or 4" can be measured according to the capacitance variation, and the gaps G1, G2, and G3 between the object OBJ and the individual force sensors 4, 4' or 4" can also be individually measured by using the self capacitive detection and the mutual capacitive detection mentioned above. When the greater force is applied to the object OBJ, the capacitances of the gaps G1, G2, and G3 will be saturated, however, the additional force will be sensed by the individual force sensors 4, 4' or 4" due to the increased capacitance values therebetween.

Please refer to FIG. 4E, the object OBJ may further include a third electrode 416 made of metal material, which may also serve as an electrode of another capacitive sensing structure to adjust the sensing mode, the strength of the sensing signals, and the signal to noise ratio. Furthermore, a given voltage may be applied to the third electrode 416 to change the voltage level of thereof, such that the sensing mode may also be adjustable. For example, when the third electrode 416 is grounded, that is, the voltage level thereof is equal to 0, the proximity of the applied force may be detected by utilizing the self-capacitive.

Figure 5A:
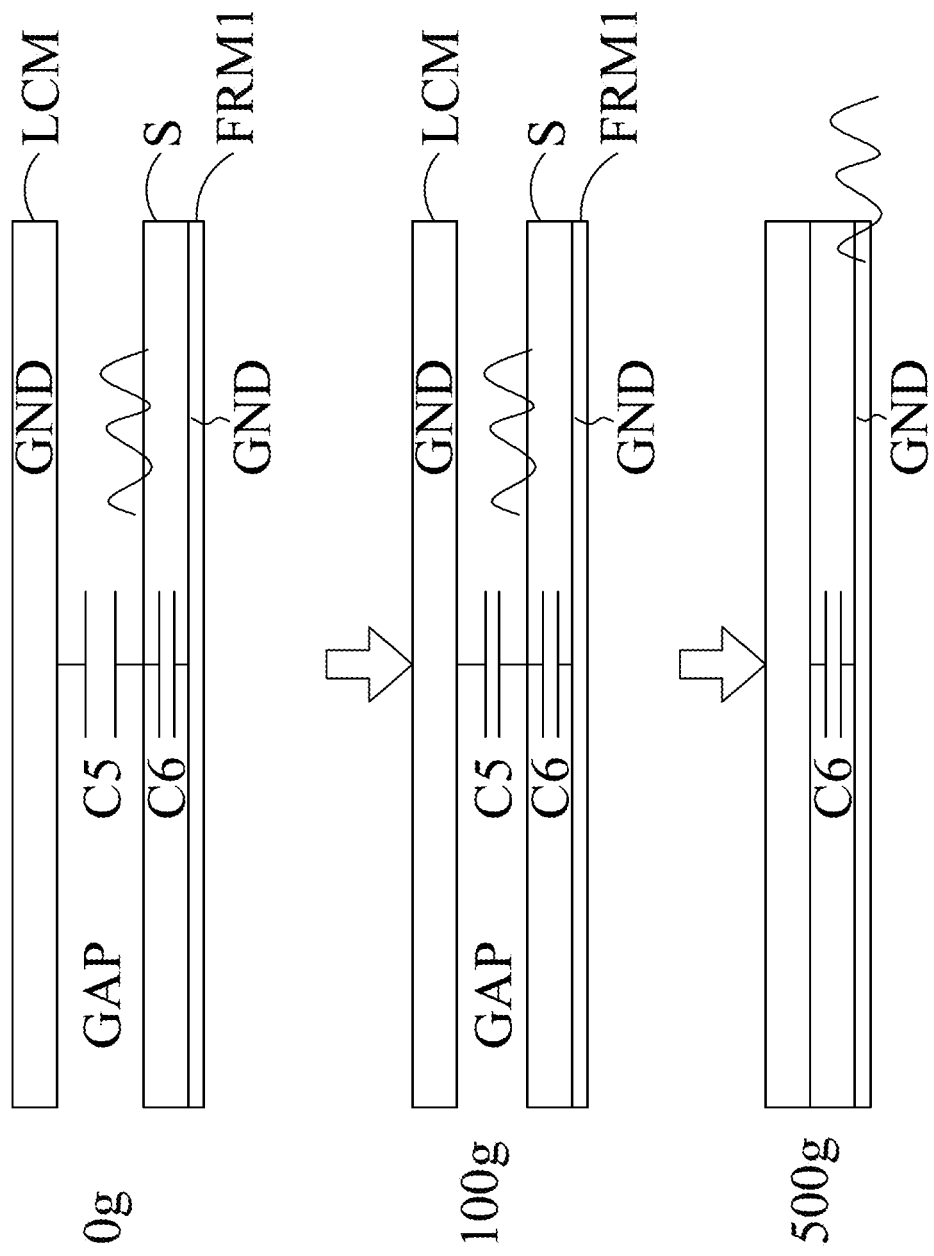
FIGS. 5A-5L are schematic diagrams of the second embodiments of a force sensing device of the present disclosure.

FIGS. 5A-5N are schematic diagrams of the second embodiment of a force sensing device of the present disclosure. For integrating the display module, such as a conventional LCD module, LED module, OLED module, and AMOLED module into the force sensing device, a cover glass, a middle frame, and an outside housing are needed to protect and support the structure of the force sensing device. Therefore, the space retained for implementing the above-mentioned proximity detection and force detection, and the thickness and the structure stabilities, should be taken into consideration when the design is made.

According to FIG. 5A, which sequentially illustrates a simple structure of the force sensing device under different magnitudes of the applied forces, which includes a display module DPM, a sensor film 5 includes the force sensing structure and its related circuits as described hereinabove, and a middle frame FRM1 for supporting the structure. As shown in figure, the grounded display module DPM is separated from the sensor film 5 with an air gap GAP, and the sensor film 5 is attached to the grounded middle frame. Here, the display module DPM is served as the plate-shaped and flexible object, and the middle frame FRM1 is served as the base layer as mentioned before. Therefore, capacitances C5 and C6 are formed as shown in figure, as the applied force increases, the air gap GAP is reduced and causes capacitance variations on capacitances C5 and C6. Therefore, the proximity of the display module DPM and the applied forces can be detected. Note that the sensor film 5 may be attached to one of the display module DPM and the middle frame FRM1, the proximity of the display module DPM and the applied forces can be similarly detected, the repeated description is omitted. By utilizing the structure, the proximity and the applied forces can still be detected even the air gap is closed (display module DPM contacts the middle frame FRM1) to achieve dual mode detection.

Please refer to FIGS. 5B-5L, the structure embodiments of the force sensing device will be described hereinafter. From FIG. 5B, the force sensing device 501A includes a cover glass CG, support members SUP, a display module DPM, a sensor film 5, and a middle frame MF. The middle frame MF is separated into a center region and a periphery region, and has a cavity at the center region for accommodating the display module DPM and the sensor film 5, and a concave portion is formed in the periphery region of the middle frame MF to accommodate the cover glass CG, and the cover glass CG is attached and fixed to the periphery region of the middle frame through the support members SUP. In the embodiment, the display module DPM is attached to the cover glass CG, the sensor film 5 is attached to a bottom surface of the cavity of the middle frame MF and separated from the display module DPM with an air gap GAP. The thickness of the air gap GAP may be designed according to the needs (from 0 to several mm). When the forces are applied to the cover glass CG, the thickness of the air gap GAP is reduced, furthermore, is closed, and the proximity of the cover glass CG is able to be detected according to the capacitance variations, where the applied forces may also be detected by the sensor film 5 by using the similar method as described in FIG. 5A. Moreover, the sensor film 5 of the force sensing device 501B may also be attached to the display module DPM in FIG. 5C, the proximity of the display module DPM and the applied forces can be similarly detected, the repeated description is omitted.

Figure 5B:
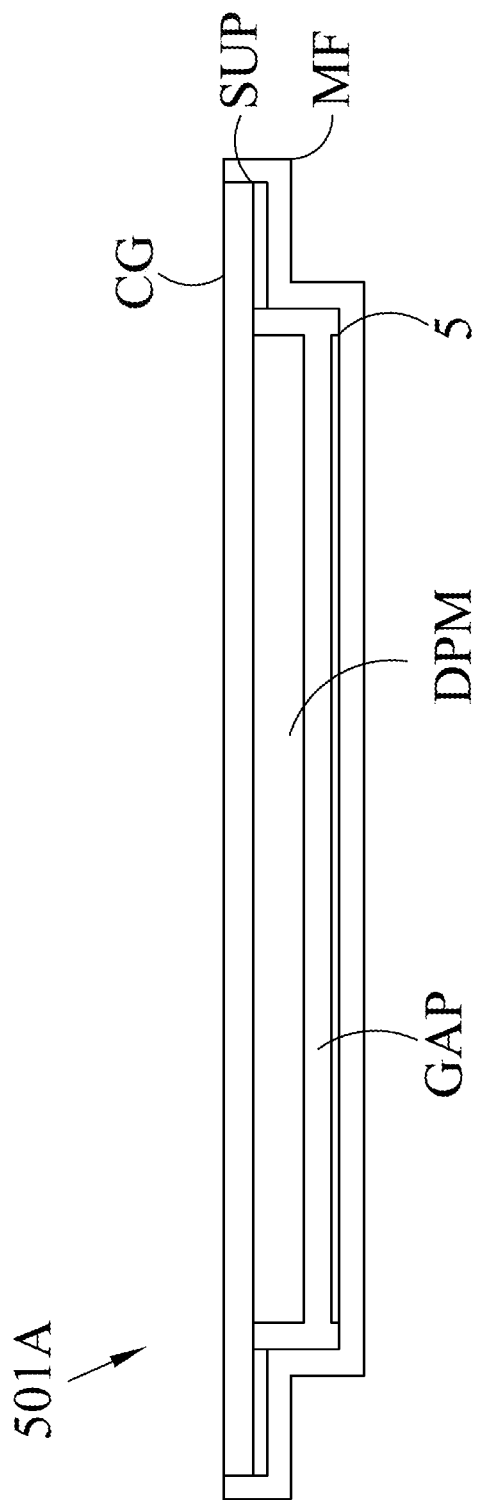
Figure 5C:
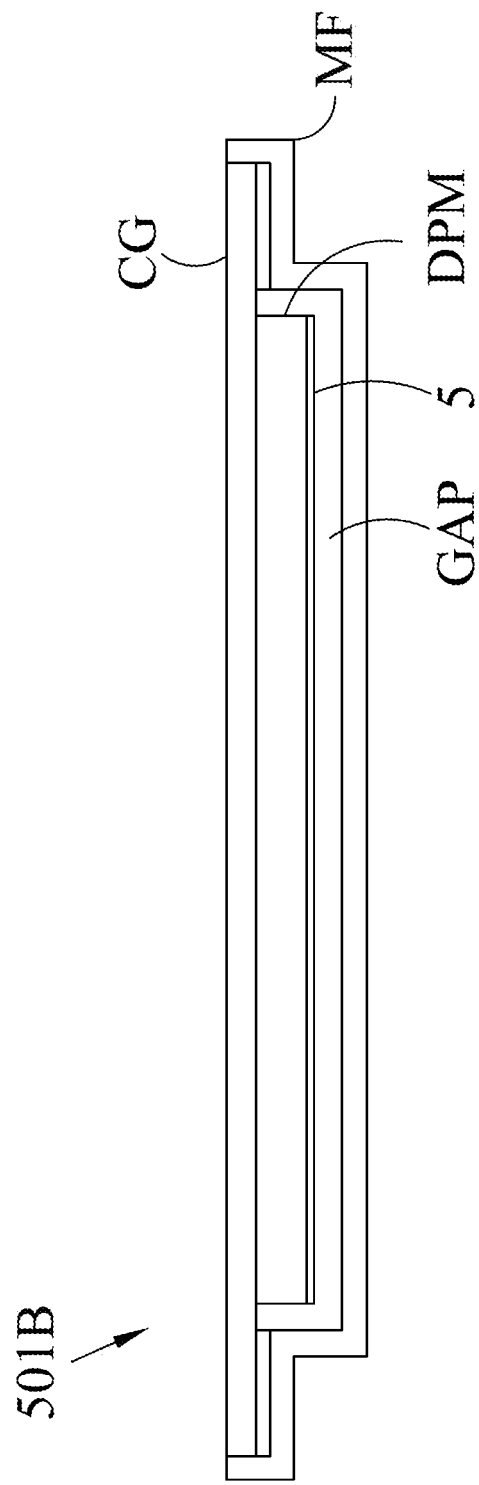
Figure 5D:
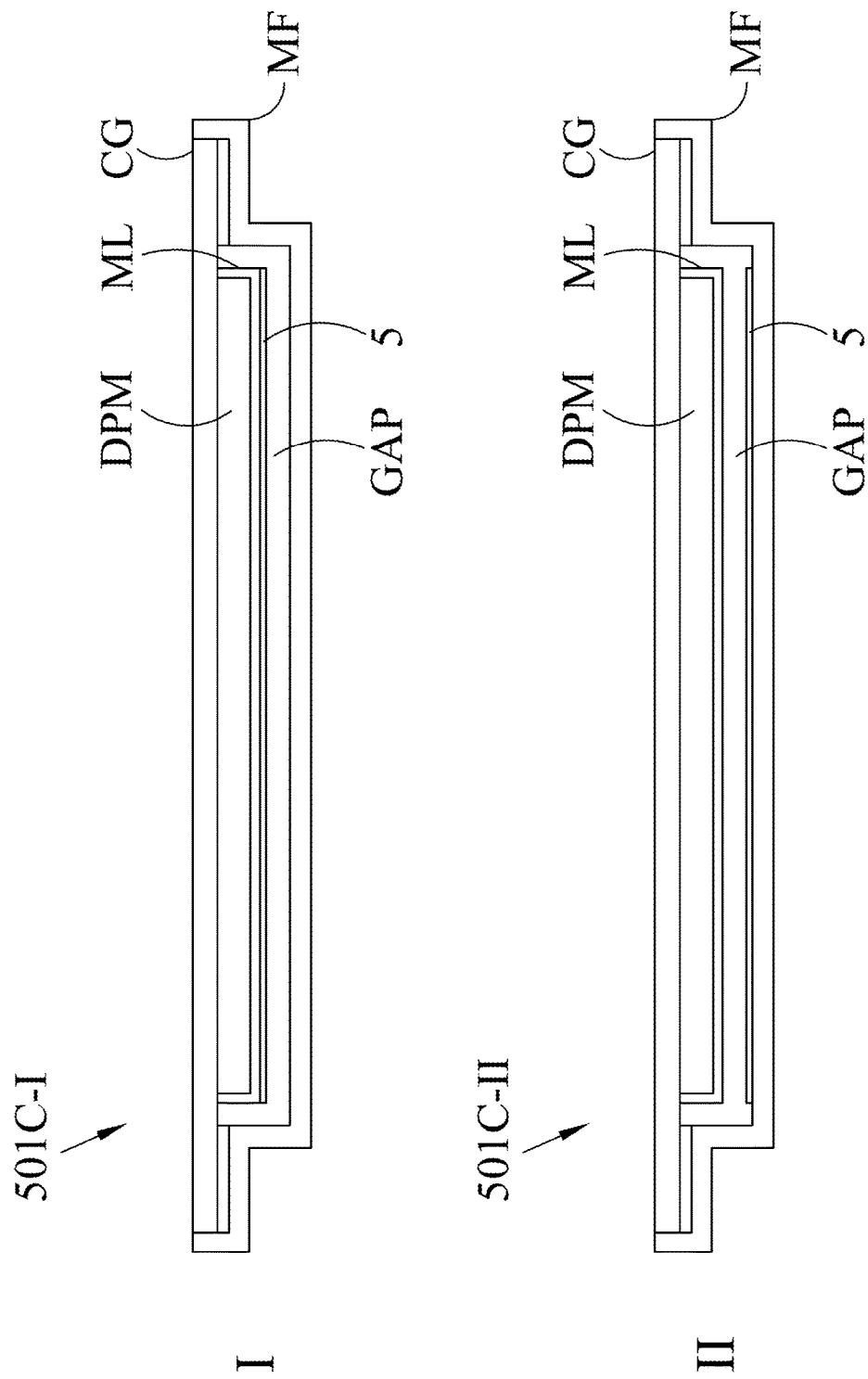

Please refer to FIG. 5D, the force sensing device 501C-I further includes a metal frame layer ML surrounded the display module DPM and a bottom surface of the metal frame layer ML is attached to the sensor film 5. Similar to FIG. 4E, the metal frame layer ML may also serve as an electrode of another capacitive sensing structure to adjust the sensing mode, the strength of the sensing signals, and the signal to noise ratio. Although the sensor film is shown to attach the bottom surface of the metal frame layer ML, which may also attach to the middle frame MF, as shown in the force sensing device 501C-II, the proximity of the display module DPM and the applied forces can be similarly detected, the repeated description is omitted.

Figure 5E:
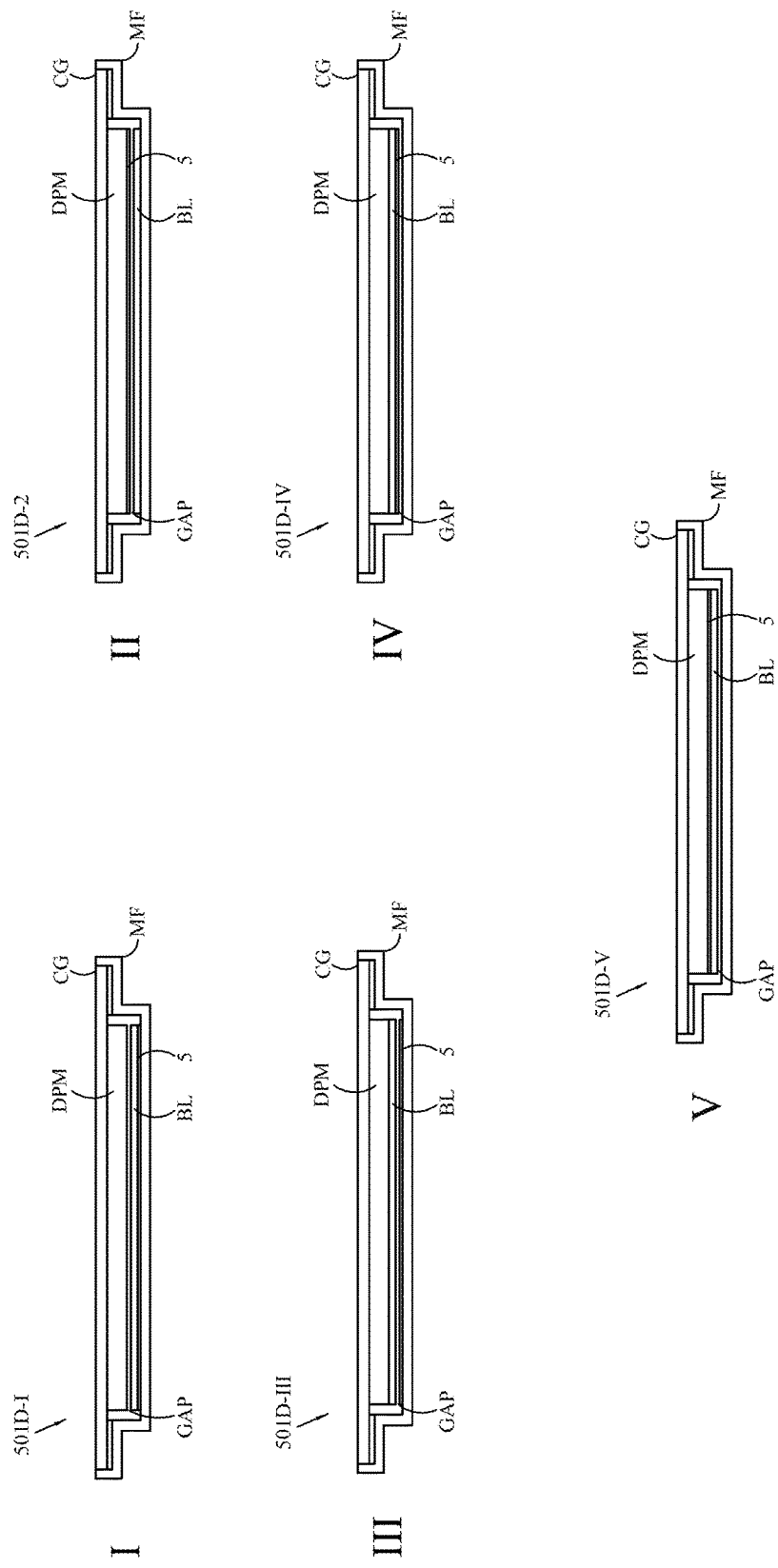

Please refer to FIG. 5E, which illustrates a modified embodiment from FIG. 5B. The force sensing device 501D-I further includes a buffer layer BL disposed between the sensor film 5 and the middle frame MF. A lower surface of the buffer layer BL may be attached to the sensor film 5 and the middle frame MF through adhesive. Furthermore, the buffer layer BL may serve as a cushion therebetween to prevent structural destructions while the display module DPM directly contacts the sensor film 5, and the buffer layer includes at least one force concentration feature. The proximity of the display module DPM and the applied forces can be similarly detected, the repeated description is omitted. Although the buffer layer BL is shown to be attached to the sensor film 5, the buffer layer BL may also be disposed in different positions with respect to the sensor film 5 and the display module DPM, as shown in the force sensing device 501D-II~501D-V.

Figure 5F:
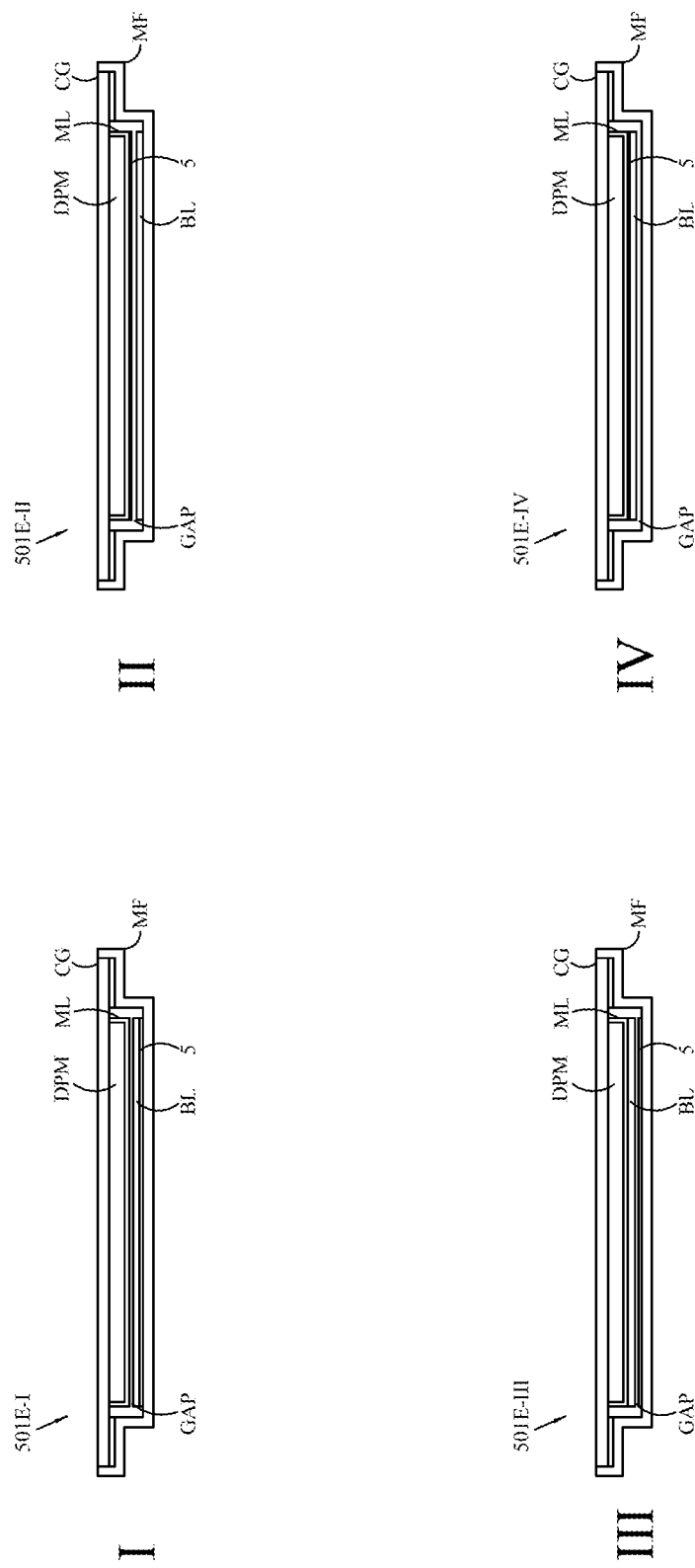

Please refer to FIG. 5F, which illustrates a modified embodiment from FIG. 5D. The force sensing device 501E-I further includes a buffer layer BL disposed between the sensor film 5 and the middle frame MF. A lower surface of the buffer layer BL may be attached to the sensor film 5 through adhesive. The buffer layer BL may serve as a cushion therebetween to prevent structural destructions while the metal frame layer ML directly contacts the sensor film 5, and the buffer layer includes at least one force concentration feature. The proximity of the metal frame layer ML and the applied forces can be similarly detected, the repeated description is omitted. Although the buffer layer BL is shown to be attached to the sensor film 5, the buffer layer BL may also be disposed in different positions with respect to the sensor film 5 and the metal frame layer ML, as shown in the force sensing device 501E-II~501D-IV.

Figure 5G:
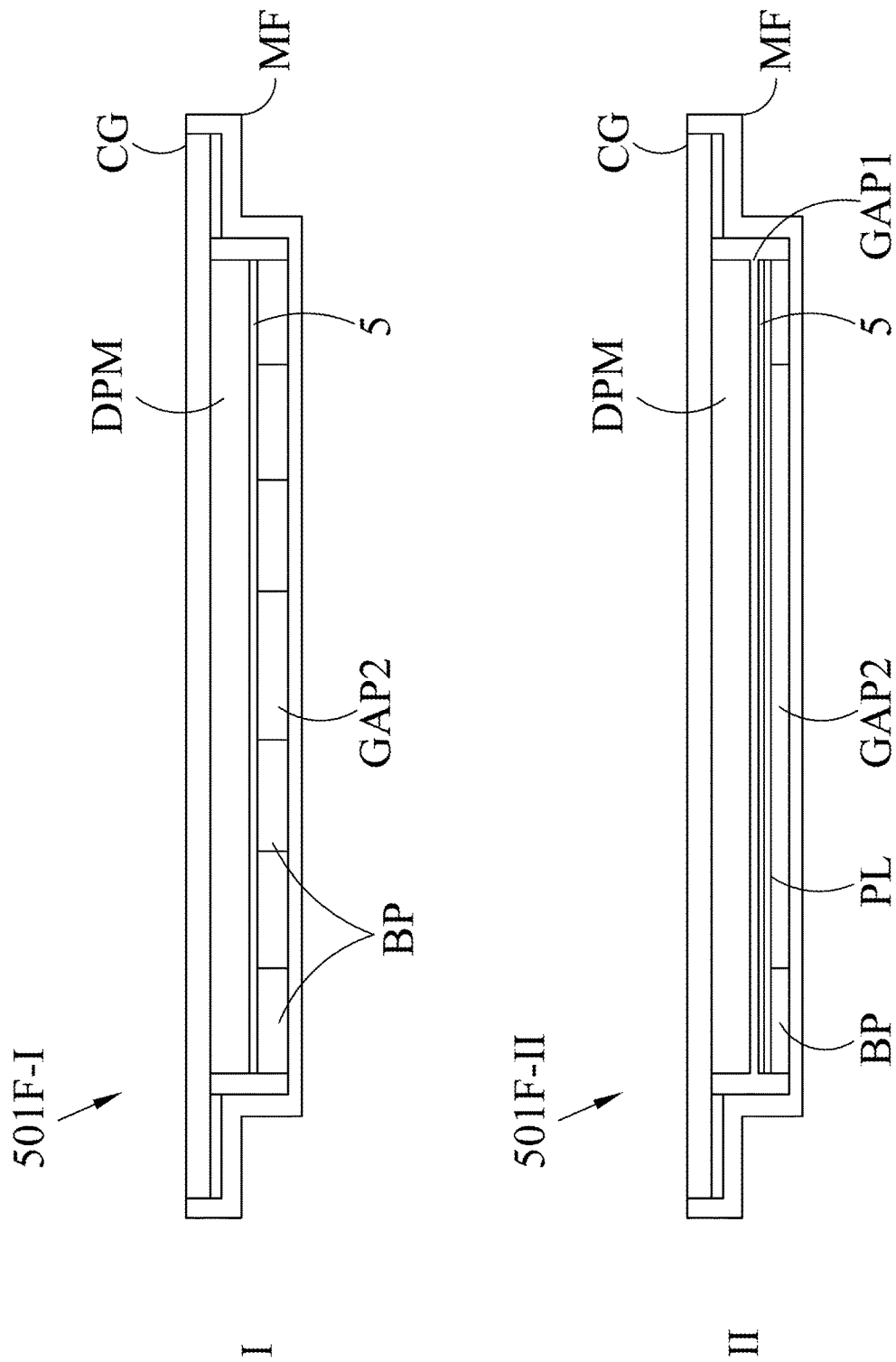

Please refer to FIG. 5G, which illustrates a modified embodiment from FIG. 5E. In the force sensing device 501F-I, the buffer layer BL may be replaced by a buffer structure formed of a plurality of bumpers BP. The plurality of bumpers BP may be attached to the sensor film 5 and the middle frame MF. The sensor film 5 is supported and fixed by the bumpers BL, and only air gaps GAP2 are formed between the bumpers BP to prevent structural destructions while the sensor film 5 directly contacts the middle frame MF. The proximity of the display module DPM and the applied forces can be similarly detected, the repeated description is omitted. Furthermore, the force sensing device 501F-II is a modified embodiment of the force sensing device 501F-I, a flexible plate PL is further disposed between the sensor film 5 and the bumpers BP, and the sensor film 5 is separated from the display module DPM. The structural destructions may also be prevented while the display module DPM contacts the sensor film 5.

Figure 5H:
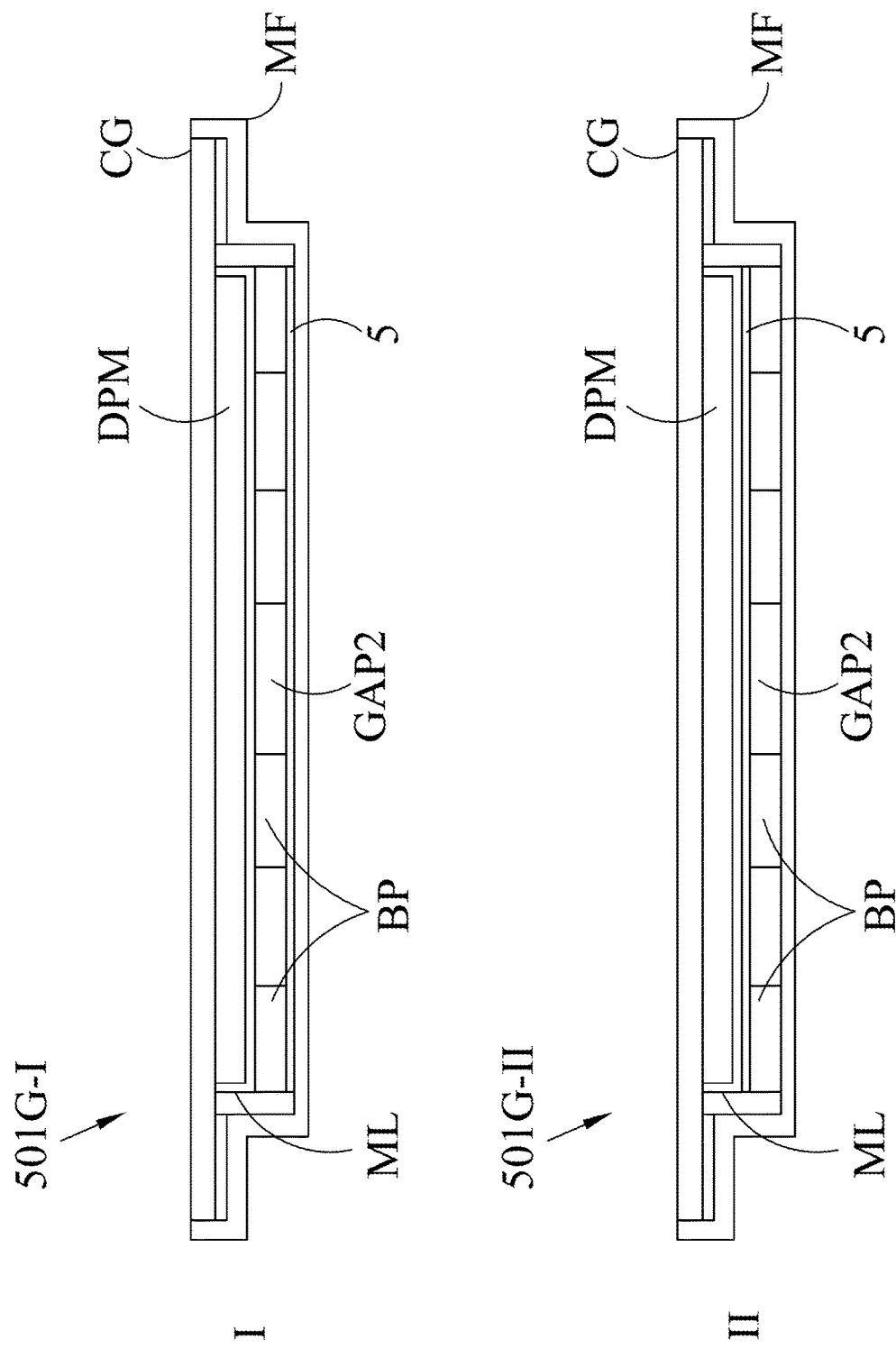

Please refer to FIG. 5H, which illustrates a modified embodiment from FIG. 5F. A plurality of bumpers BP are disposed between the sensor film 5 and the metal frame layer ML to replace the buffer layer BL. The bumpers BP may be attached to the sensor film 5 and the metal frame layer ML of the force sensing device 501G-I. Whole region of the sensor film 5 is supported and fixed by the bumpers BP. Only air gaps GAP2 are existed between the bumpers BP to prevent structural destructions while the metal frame layer ML directly contacts the sensor film 5. The proximity of the display module DPM and the applied forces can be similarly detected, the repeated description is omitted. Similarly, even the positions of the bumpers BP and the sensor film 5 are exchanged, as shown in the force sensing device 501G-II, the structural destructions may also be prevented.

Figure 5I:
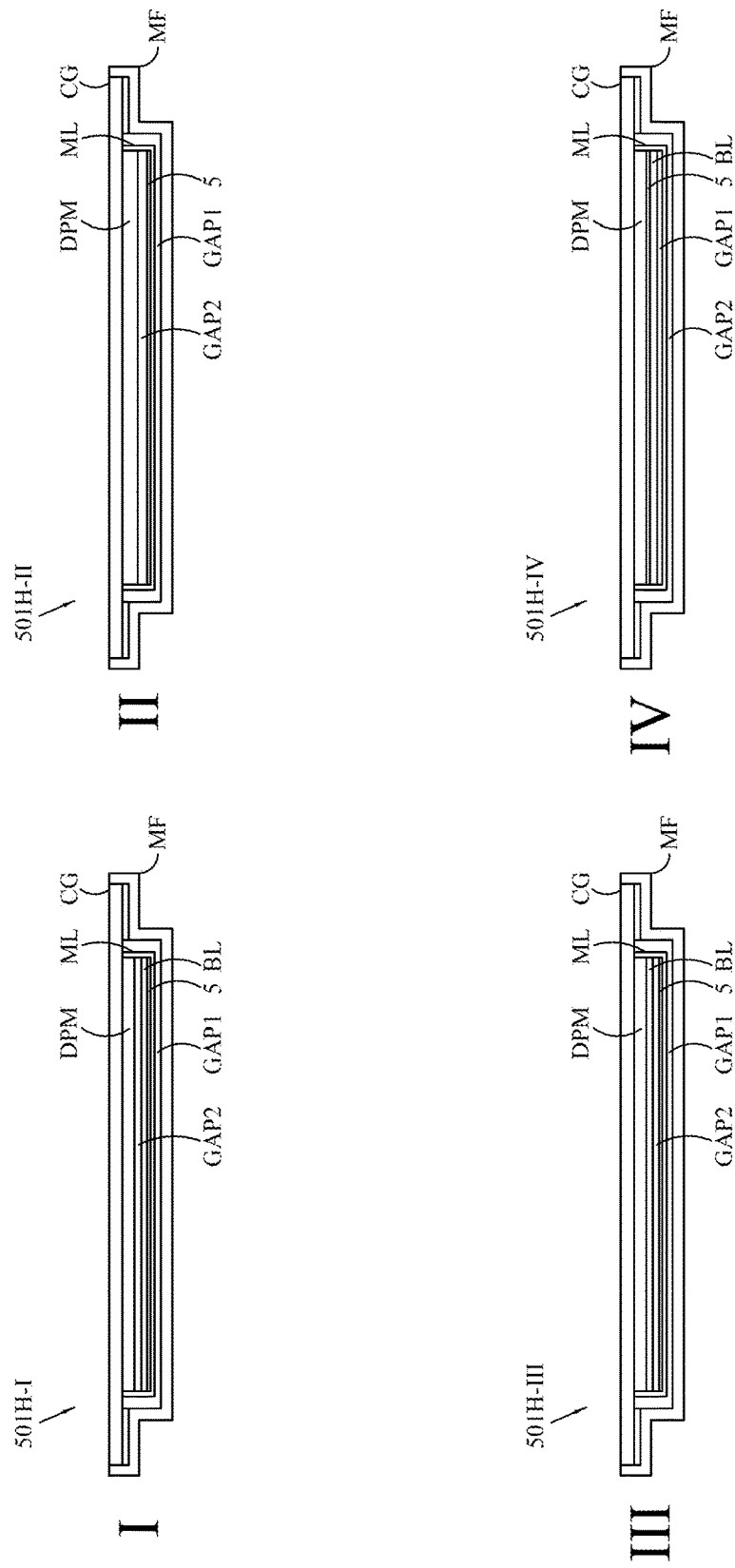

Please refer to FIG. 5I, which illustrates a modified embodiment from FIG. 5F. The cavity of the metal frame layer MF may further accommodate the sensor film 5 and the buffer layer BL in the force sensing device 501H-I. The buffer layer BL is attached to the sensor film 5 and separated from the display module DPM. Air gaps GAP1 and GAP2 are formed to prevent structural destructions while the display module DPM directly contacts the sensor film 5 and while the metal frame layer ML directly contacts the middle frame MF. In the modified cases, such as the force sensing devices 501H-II~IV, the buffer layer BL may be omitted, or the position thereof may be varied. The proximity of the display module DPM and the applied forces can be similarly detected, the repeated description is omitted.

Figure 5J:
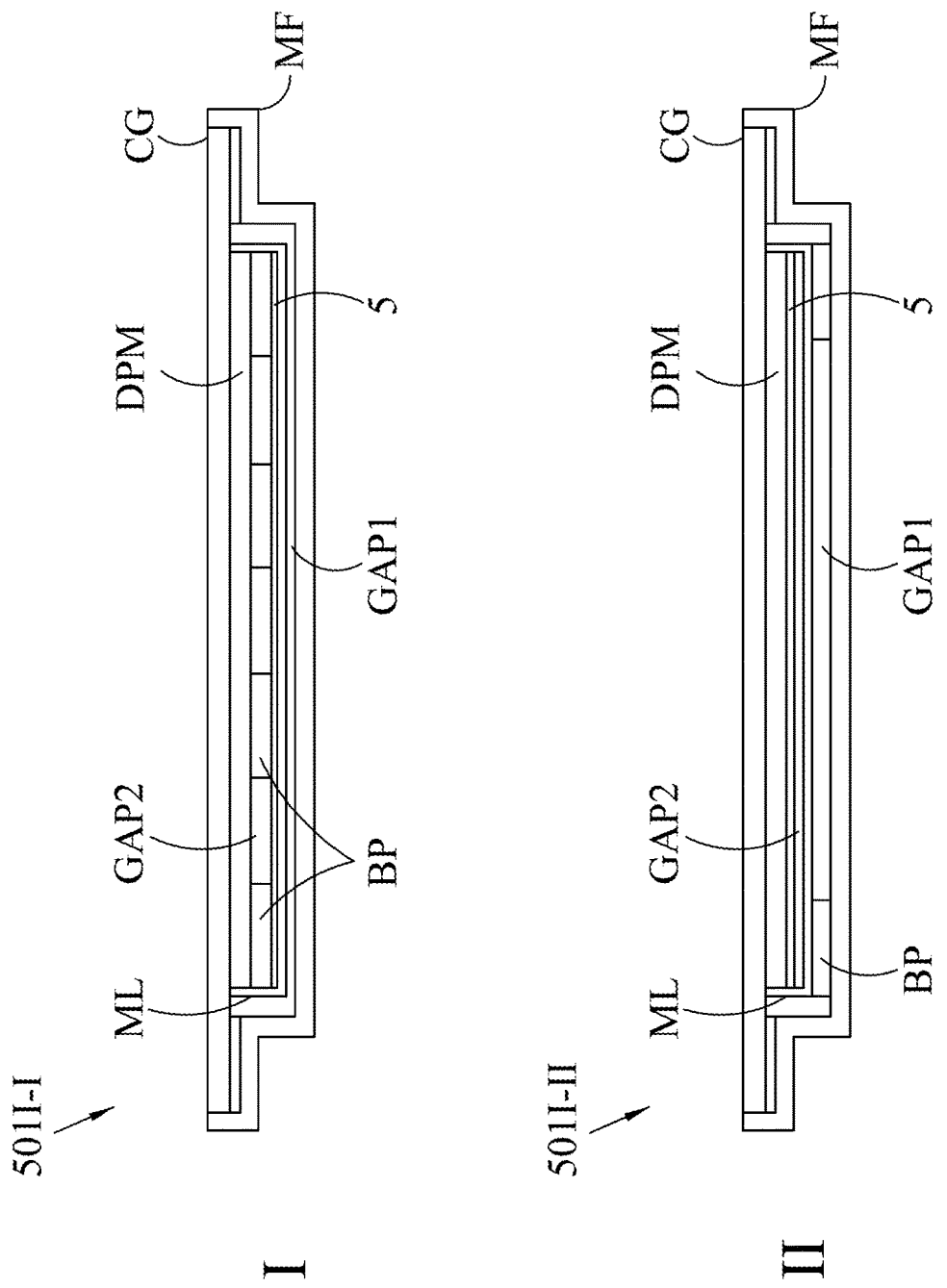

Please refer to FIG. 5J, which illustrates a modified embodiment from FIG. 5I. The buffer layer BL may be replaced by the bumpers BP in the force sensing device 501I-I. Similar to the role of the buffer layer BL in FIG. 5I, the bumpers BP is served as a buffer structure, and the air gaps GAP1 and GAP2 are also formed to prevent structural destructions while the display module DPM directly contacts the sensor film 5 and while the metal frame layer ML directly contacts the middle frame MF. Furthermore, the force sensing device 501I-II is a modified embodiment of the force sensing device 501I-I, a periphery region of the metal frame layer ML is supported and fixed to the middle frame MF by the bumpers BP. The metal frame layer ML and the middle frame MF may form air gaps GAP1 and GAP2 to prevent structural destructions while the display module DPM directly contacts the sensor film 5 and while the metal frame layer ML contacts the middle frame MF. The proximity of the display module DPM and the applied forces can be similarly detected, the repeated description is omitted.

Figure 5K:
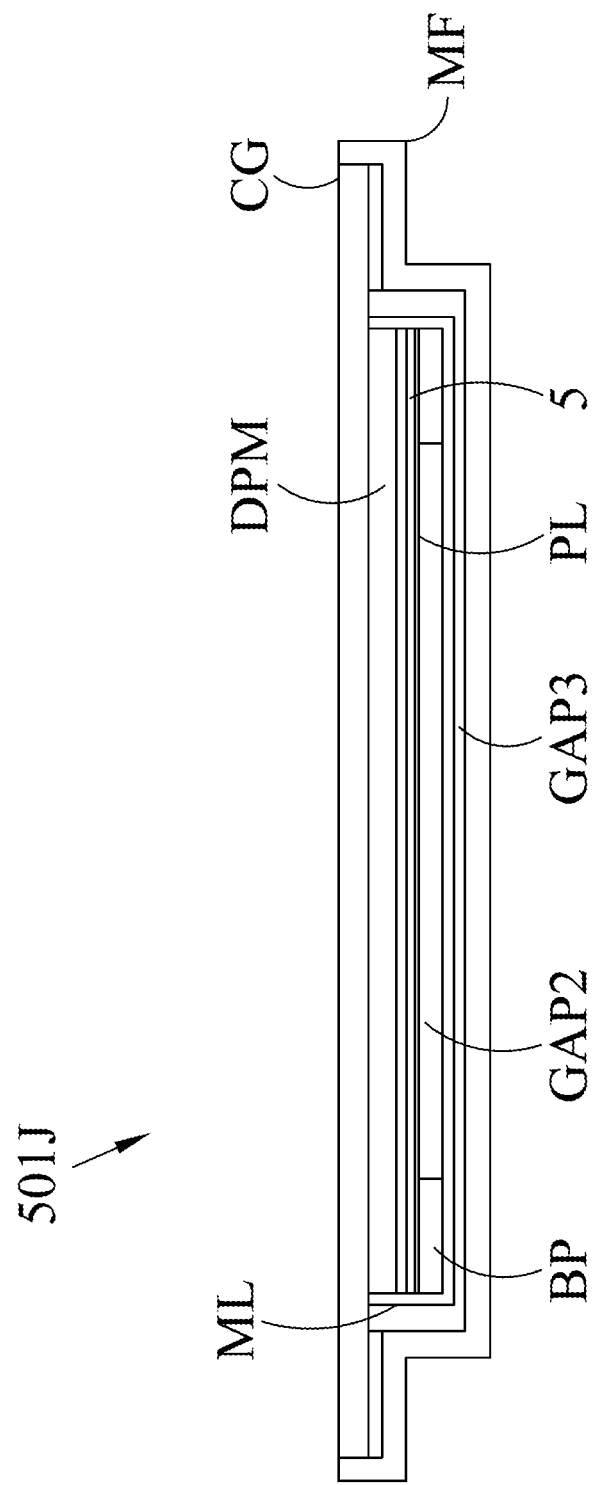

Please refer to FIG. 5K, which illustrates a modified embodiment from FIG. 5H. In the force sensing device 501J, the cavity of the metal frame layer MF may further accommodate the sensor film 5, and the buffer structure includes the flexible plate PL and the bumpers BP. The periphery region of the flexible plate PL is supported and fixed to the metal frame layer ML by the bumpers. The flexible plate PL and the bumpers BP may form an air gap GAP2 therebetween to prevent structural destructions while the display module DPM directly contacts the sensor film 5. Moreover, the metal frame layer ML is separated from the middle frame MF with an air gap GAP3. The proximity of the display module DPM and the applied forces can be similarly detected, the repeated description is omitted.

Preferably, Table 1 shows the structural scales (i.e., the thickness ranges) of all elements as described in FIG. 5B-5K for reference, but not limit to the ranges describe below:

TABLE 1

| Element | Thickness Range (mm) |
| --- | --- |
| Cover Glass | 0.30~1.10 |
| Metal Frame | 0.10~0.15 |
| Cover Glass + Display | 1.00~2.60 |
| Cushion | 0.10~1.0 |
| Sensor | 0.07~0.18 |
| Bumper | 0.01~0.15 |
| Flat Plate | 0.10~0.20 |
| Air Gap | 0.11~0.35 |
| Dispensed Glue | 0.10~0.22 |
| Sponge Adhesive | 0.14~0.25 |
| Middle-Frame | 0.20~0.52 |

Figure 5L:
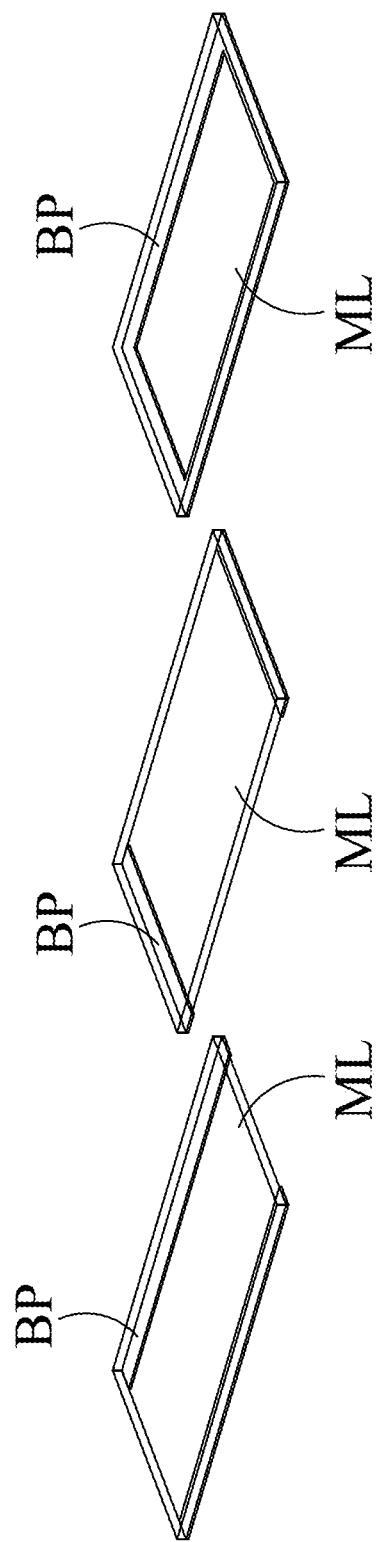

Although the numbers of the bumpers BP are shown to be two in the embodiment, the bumpers can be implemented in different way as shown in FIG. 5L, the bumpers BP may be disposed in different directions related to the metal frame layer ML, and may also be all round of the metal frame layer ML.

Figure 6A:
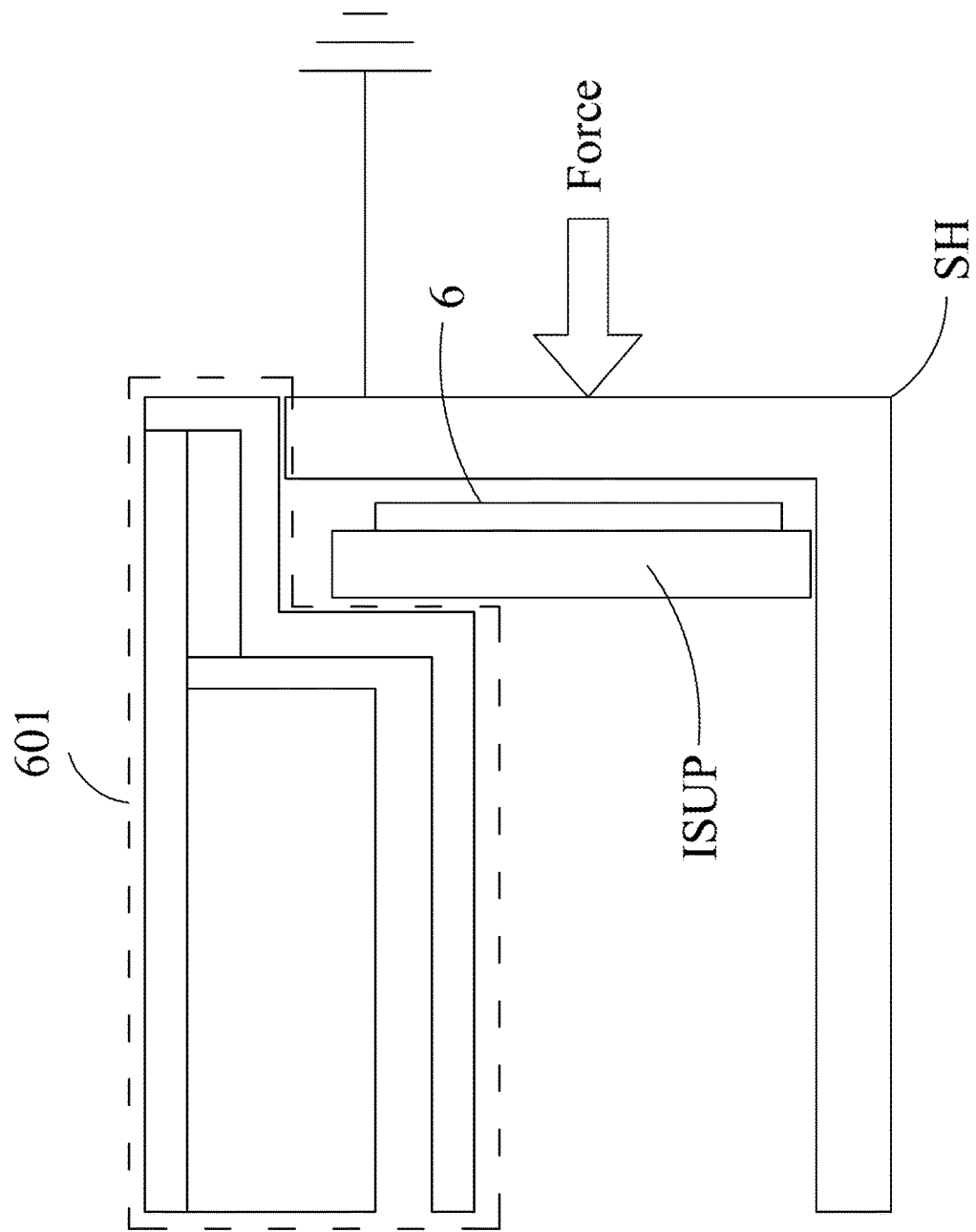
FIGS. 6A-6B are schematic diagrams of the embodiments of a side force sensing structure of the present disclosure.
Figure 6B:
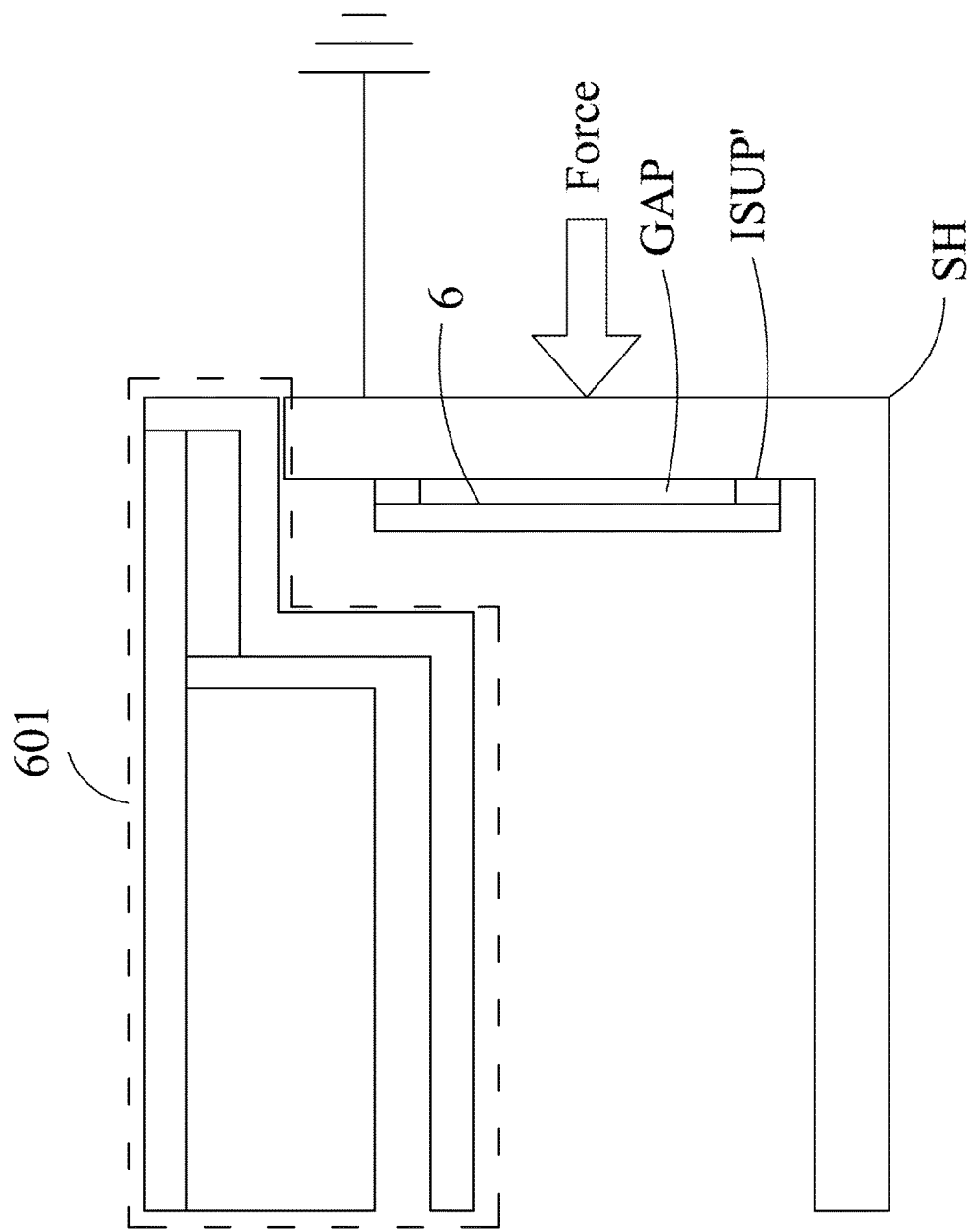

FIGS. 6A-6B are schematic diagrams of the embodiments of a side force sensing structure of the present disclosure. A mechanical structure 601 includes the force sensing devices described in FIGS. 5A-5K are typically disposed in an outside housing SH, and the outside housing SH may further accommodate other electronic elements. For replacing conventional side buttons and providing a side force sensing panel for the force sensing device, the force sensing structure described in the FIGS. 1A-3 are included in a sensor film 6, which is disposed at an inner side surface of the outside housing SH. Two different ways to implement the side force sensing panel are shown in FIG. 6A-6B. The force sensing film 6 may be attached to an inner support ISUP, which may be fixed to a bottom surface of the outside housing SH and the mechanical structure 601 for indirectly fixing the sensor film 6, such that the proximity of a side portion of the outside housing SH may be detected according to a capacitance variation while the side portion is pressed.

The other way to implement the side force sensing panel is to fix the sensor film 6 to a side inter surface of the outside housing SH through inner support parts ISUP'. The inner support parts ISUP' may form an air gap GAP, and side inter surface of the outside housing SH and the applied forces can be similarly detected, the repeated description is omitted.

From above, according to the force sensing structure and the force sensing device of the present application, the proximity and the applied force can be detected by a single sensor including dual-mode. The proximity mode and the contact mode of the force sensing structure are both capable of detecting the proximity and the applied force according to the capacitance variations therein, such that an extra force sensing device (or sensor) may be omitted, and the thickness of the force sensing module may further be shrinked.

Moreover, by adding the buffer layer or the buffer structure in the mechanical structure of the force sensing device, structural destructions may be prevented while the solid part of any members directly contacts the sensor film. Extra metal parts may also be included in the force sensing structure to serve as an electrode of another capacitive sensing structure to adjust the sensing mode, the strength of the sensing signals, and the signal to noise ratio, and a side force sensing function may also be achieve by utilizing the force sensing structure of the present application.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A force sensing structure comprising:
a force touch sensor configured to detect a proximity of an object to the force touch sensor from an upside and a force applied by the object to the force touch sensor, which comprises:
a first electrode disposed separately from the object with a gap; and
a first capacitance material layer disposed adjacent to the first electrode,
wherein when the object approaches the force touch sensor, the force touch sensor is configured to detect the proximity of the object according to a first capacitance change therebetween,
and when the object contacts the force touch sensor and at least a portion of the force is applied to the first capacitance material layer, the force touch sensor is configured to detect the force applied by the object according to a second capacitance change therebetween.

2. The force sensing structure of claim 1, wherein the first capacitance material layer is disposed on the first electrode.

3. The force sensing structure of claim 1, wherein the first capacitance material layer is made of piezo-capacitive material, and when the object contacts the force touch sensor and at least a portion of force is applied to first capacitance material layer, the force touch sensor is configured to detect the force applied by the object according to the second capacitance change therebetween, which has substantially positive correlation with a magnitude of the applied force.

4. The force sensing structure of claim 1, wherein the first electrode is disposed on the first capacitance material layer.

5. The force sensing structure of claim 4, further comprising a base layer disposed under the first capacitance material layer and an insulating layer disposed on the first electrode, wherein the base layer and the object are grounded, when the object contacts the force touch sensor and at least a portion of force is applied to the first capacitance material layer, the force touch sensor detects the force applied by the object according to the second capacitance change therebetween.

6. The force sensing structure of claim 4, further comprising a second electrode disposed under the first capacitance material layer, wherein the first capacitance material layer is disposed to contact at least one of the first electrode and the second electrode, and the force touch sensor is configured to detect the force applied to the object according to the second capacitance change between the first electrode and the second electrode.

7. The force sensing structure of claim 6, further comprising an insulating layer disposed on the first electrode, and a switch electrically connected between the first electrode and the second electrode, wherein when the switch is closed and the object is grounded, the first electrode is shorted with the second electrode, and the force touch sensor detects the force applied to the object according to the second capacitance change between the first electrode and the second electrode.

8. The force sensing structure of claim 7, wherein when the switch is opened and the first electrode is grounded, the force touch sensor detects the force applied to the object according to the second capacitance change of the second electrode and the first capacitance material layer.

9. The force sensing structure of claim 6, further comprising an air gap between the first capacitance material layer and the first electrode, wherein the air gap is partially filled with a second capacitance material layer.

10. The force sensing structure of claim 6, further comprising an air gap between the first capacitance material layer and the first electrode, wherein the air gap is filled with a second capacitance material layer.

11. The force sensing structure of claim 6, wherein the object is deformable, wherein when the force is applied to the object, a part of the object approaches to the first electrode, and the force touch sensor detects the force applied to the object according to the first capacitance change, and when the object comes to contact the first electrode, the force touch sensor detects the force applied to the object according to the second capacitance change due to a force transfer to the first capacitance material layer.

12. The force sensing structure of claim 6, wherein the object is deformable and substantially sheet-shaped, wherein when the force is applied to the object, a part of the object corresponding to a position where the force is applied approaches to the first electrode, and the force touch sensor detects the force applied to the object according to the first capacitance change, and when the object comes to contact the first electrode, the force touch sensor detects the force applied to the object according to the second capacitance change due to a force transfer to first capacitance material layer.

13. The force sensing structure of claim 4, further comprising:
a second electrode disposed between the first electrode and the first capacitance material layer;
an insulating layer disposed between the first electrode and the second electrode; and
a third electrode disposed under the first capacitance material layer,
wherein when the object approaches the force touch sensor, the force touch sensor is configured to detect the proximity of the object according to a first capacitance change between the first electrode and the object,
and when the object contacts the force touch sensor and applies at least a portion of the force to the first capacitance material layer, the force touch sensor is configured to detect the force applied to the object according to a second capacitance change between the second electrode and the third electrode.

14. The force sensing structure of claim 13, further comprising an air gap between the second electrode and the third electrode, wherein the air gap is partially or totally filled with a second capacitance material layer.

15. A force sensing device, comprising:
a plurality of sensor cells configured to detect a proximity of an object to the force sensing device from an upside and a force applied by the object to the force sensing device, wherein each sensor cell comprises:
the force sensing structure according to claim 1;
a driving circuit coupled to each of the sensor cell through a plurality driving lines for sequentially applying the driving signals to the driving lines;
a sensing circuit coupled to each of the sensor cell through a plurality sensing lines, the sensing circuit being configured to receive sensing signals generated by detecting a change in the first capacitance and the second capacitance sensed from each of the sensing cells; and a processor is configured to receive the sensing signals from the sensing circuit to determine touched positions, the proximities, and the applied force.

16. The force sensing device of claim 15, wherein the force sensing structure further comprises a second electrode disposed under the first capacitance material layer, and the first electrodes and the second electrodes of each of the plurality of the sensor cells are shared by the corresponding sensor cells disposed in same column or row.

17. The force sensing device of claim 15, wherein the sensor cells are sufficiently mechanically isolated from each other.

18. The force sensing device of claim 15, wherein the force sensing structure further comprises a second electrode disposed above the first electrode;
   an insulating layer disposed between the first electrode and the second electrode; and
   a grounded base disposed under the first capacitance material layer,
   wherein when the object approaches the force touch sensor, the force touch sensor is configured to detect the proximity of the object according to a first capacitance change between the first electrode and the object,
   and when the object contacts the force touch sensor and applies at least a portion of the force to the first capacitance material layer, the force touch sensor is configured to detect the force applied to the object according to a second capacitance change between the first electrode and the second electrode.

19. The force sensing device of claim 15, further comprising an outside housing encapsulating the force sensing device, and at least one support structure inside the housing to support the force sensing structure.

20. The force sensing device of claim 15, further comprising:
   a cover glass disposed on the plurality of sensor cells;
   a display module disposed between the plurality of sensor cells and the cover glass, and attached to the cover glass;
   a first frame disposed under the plurality of sensor cells and provided with a first cavity for accommodating the display module and the plurality of sensor cells.

21. The force sensing device of claim 20, wherein the plurality of sensor cells are arranged in the first cavity, and the plurality of sensor cells is attached to one of the display module and a surface of the first cavity.

22. The force sensing device of claim 21, further comprising a second frame disposed under the cover glass and in the first cavity, the second frame having a second cavity for accommodating the display module.

23. The force sensing device of claim 20, further comprising a buffer layer disposed adjacent to the plurality of the sensor cells.

24. The force sensing device of claim 23 wherein the buffer layer comprises a material sheet and at least one bumper.

25. The force sensing device of claim 23, wherein the buffer layer comprises a foam sheet.

26. The force sensing device of claim 23, wherein the buffer layer comprises at least one force concentration feature.

27. The force sensing device of claim 20, further comprising a buffer layer disposed under the display module and adjacent to the plurality of the sensor cells.

* * * * *